(12) United States Patent
Conrad et al.

(10) Patent No.: US 11,449,218 B2
(45) Date of Patent: Sep. 20, 2022

(54) SYSTEMS AND METHODS FOR DATA EVALUATION AND CLASSIFICATION

(71) Applicant: Thomson Reuters Global Resources Unlimited Company, Baar (CH)

(72) Inventors: Jack G. Conrad, Eagan, MN (US); Mans Olof-Ors, Zurich (CH); Peter Pircher, Baar (CH)

(73) Assignee: Thomson Reuters Enterprise Centre GmbH, Zug (CH)

( * ) Notice: Subject to any disclaimer, the term of this patent is extended or adjusted under 35 U.S.C. 154(b) by 132 days.

(21) Appl. No.: 14/802,080

(22) Filed: Jul. 17, 2015

(65) Prior Publication Data
US 2017/0017387 A1 Jan. 19, 2017

(51) Int. Cl.
*G06F 3/04883* (2022.01)
*G06F 3/0488* (2022.01)
(Continued)

(52) U.S. Cl.
CPC ........ *G06F 3/04883* (2013.01); *G06F 3/0488* (2013.01); *G06F 16/353* (2019.01); *G06F 16/93* (2019.01); *G06Q 50/18* (2013.01)

(58) Field of Classification Search
CPC ............. G06F 3/0488; G06F 17/30722; G06F 17/30705; G06F 3/04883; G06F 17/30011; G06F 17/30707; G06F 17/3071; G06F 17/30713; G06F 17/30725; G06F 17/30728; G06F 17/30126; G06F 17/3002;
(Continued)

(56) References Cited

U.S. PATENT DOCUMENTS

| 5,418,946 | A | | 5/1995 | Mori | |
|---|---|---|---|---|---|
| 5,450,545 | A | * | 9/1995 | Martin | ...................... G06F 8/30 717/109 |
| 5,519,865 | A | | 5/1996 | Kondo et al. | |

(Continued)

FOREIGN PATENT DOCUMENTS

EP 0410036 A1 1/1991

OTHER PUBLICATIONS

Dulberg et al: "An Imprecise Mouse Gesture for the Fast Activation of Controls", Interact Conference Proceedings, 1999, pp. 375-382, XP002385307.

(Continued)

*Primary Examiner* — David S Posigian
(74) *Attorney, Agent, or Firm* — Antonio Papageorgiou; Lombard & Geliebter LLP

(57) ABSTRACT

The present disclosure is directed towards systems and methods for evaluating and classifying data, which comprises receiving a first signal associated with a set of user defined categories and a second signal associated with a first set of one or more data items to be analyzed. The set of categories are presented on an interface and each of the data items are to be analyzed are presented on a tile overlay on the interface. A first swipe identification signal identifying a first category to apply to a first data item and a second swipe identification signal identifying a second category to apply to a second data item are received. Based upon the swipe identification signals, a first record associating the first data item with the first category and a second record associating the second data item with the second category are generated and stored in a memory.

20 Claims, 15 Drawing Sheets

(51) Int. Cl.
*G06F 16/93* (2019.01)
*G06F 16/35* (2019.01)
*G06Q 50/18* (2012.01)

(58) Field of Classification Search
CPC ............. G06F 17/30598; G06F 16/353; G06F 16/358; G06F 16/38; G06F 16/381; G06F 16/382; G06F 16/93; G06F 16/41; G06F 16/168; G06F 16/285; G06F 16/2428; G06F 16/35; G06Q 50/18
See application file for complete search history.

(56) References Cited

U.S. PATENT DOCUMENTS

| | | | |
|---|---|---|---|
| 5,945,982 A | 8/1999 | Higashio et al. | |
| 8,548,997 B1* | 10/2013 | Wu | G06Q 10/103 707/736 |
| 2010/0223108 A1* | 9/2010 | Quinn, Jr. | G06Q 10/0639 705/347 |
| 2010/0312725 A1* | 12/2010 | Privault | G06N 5/043 706/12 |
| 2010/0325102 A1* | 12/2010 | Maze | G06F 17/30011 707/722 |
| 2011/0161852 A1* | 6/2011 | Vainio | G06F 3/04842 715/769 |
| 2012/0278266 A1* | 11/2012 | Naslund | G06N 20/00 706/45 |
| 2012/0310951 A1* | 12/2012 | Kumar | G06Q 10/10 707/749 |
| 2013/0125069 A1* | 5/2013 | Bourdev | G06F 3/04845 715/863 |
| 2014/0088944 A1* | 3/2014 | Natarajan | G06F 30/20 703/13 |
| 2014/0279716 A1* | 9/2014 | Cormack | G06N 99/005 706/10 |
| 2014/0317147 A1* | 10/2014 | Wu | G06F 17/30011 707/792 |
| 2015/0286636 A1* | 10/2015 | Elkhou | G06Q 50/18 707/722 |
| 2015/0339786 A1* | 11/2015 | Morimoto | G06Q 50/18 705/311 |
| 2016/0019282 A1* | 1/2016 | Lewis | G06F 16/35 707/740 |
| 2016/0371369 A1* | 12/2016 | Cormack | G06F 16/93 |

OTHER PUBLICATIONS

MileIQ: "MileIQ Tutorial: How to Classify Drives", YouTube, May 11, 2016 (May 11, 2016), p. 1, XP054981661, Retrieved from the Internet: URL: https://www.youtube.com/watch?v=BEfFkiNDuV0.

* cited by examiner

FIG. 9

| No. | Doc Id | E.T. Clause | Reviewer 1 (Legal) | Class 1 | C1 | Reviewer 2 (F&R) | Class 2 | C2 | Reviewer 3 (F&R) | Class 3 | C3 | C1-C2-C3 Avg | C1-C2-C3 Variance | C1-C2-C3 Std. Dev. | C1-C2-C3 Norm. Avg |
|---|---|---|---|---|---|---|---|---|---|---|---|---|---|---|---|
| 10001 | 1170 | The respective parties hereto covenant and agree to take the following actions between the date hereof and the Effective Time. | Lora | Low Conformity | 1 | Tero | Low Conformity | 1 | Patrick | Low Conformity | 1 | 1.00 | 0.00 | 0.00 | 0.33 |
| 10003 | 1039 | This instrument and the merger contemplated herein shall become effective on December 31, 2003 (the "Effective Time"). | Lora | High Conformity | 3 | Tero | Low Conformity | 1 | Patrick | High Conformity | 3 | 2.33 | 1.33 | 1.15 | 0.78 |
| 10006 | 450 | The Merger shall become effective immediately upon the filing of this Agreement or a Certificate of Merger relating to the Merger with the Secretaries of State of the State of Delaware and State of | Lora | High Conformity | 3 | Tero | High Conformity | 3 | Patrick | High Conformity | 3 | 3.00 | 0.00 | 0.00 | 1.00 |

FIG. 15

SYSTEMS AND METHODS FOR DATA EVALUATION AND CLASSIFICATION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to this document: Copyright© 2015 Thomson Reuters.

TECHNICAL FIELD

This disclosure relates generally to the evaluation and classification of data. More specifically, the disclosure is directed towards systems and methods for evaluating and classifying data files, such as documents, document segments, text, text segments, images image segments and the like.

BACKGROUND

Electronic classification and analysis tools are invaluable resources that are used in nearly every business, legal, scientific and academic environment to evaluate, review and organize pertinent documents or document excerpts. For example, in the legal environment, electronic classification is a powerful and efficient tool for e-discovery and contract analysis. Such tools, however, do have limitations, typically requiring a personal computer with peripheral devices, such as the standard mouse and keyboard in order to interact with such tools and to evaluate and classify data items. Yet, with the recent gain in popularity of tablet devices and touch displays on computers, more and more end users typically limit their reliance on or do not utilize such peripheral devices, relying instead primarily on human gesture, such as finger swiping.

Accordingly, there exists a need for evaluating and classifying data sets and portions of data sets in an efficient manner without the necessity of using peripheral devices in conjunction with readily used and available touch sensitive devices.

SUMMARY

The present disclosure is directed towards systems and methods for evaluating and classifying data sets and portions of data sets. In one aspect, the method includes receiving a first signal associated with a set of categories, the set of categories being user defined, and a second signal associated with a first set of one or more data items to be analyzed. Presented on a graphical user interface are the set of categories and each of the one or more data items of the first set to be analyzed on a tile overlay. A first swipe identification signal is then received, the first swipe identification signal identifying a first category from the set of categories to apply to a first data item from the set of one or more data items to be analyzed. A second swipe identification signal is then received, the second swipe identification signal identifying a second category from the set of categories to apply to a second data item from the set of one or more data items to be analyzed. Based upon the first and second swipe identification signals, a first record and a second record are generated and stored in a memory, the first record associating the first data item with the first category and the second record associating the second data item with the second category.

According to one embodiment, the first category and the second category are the same. In one embodiment, the method further includes, generating a spreadsheet file comprising the first and second records. In one embodiment, the method further includes displaying an administration interface tool comprising an UI administration interface, a deck administration interface and an user administration interface. According to one embodiment, the method further includes populating a category name field, a category label field and a screen location field in the UI administration interface for each category of the set of categories to be assigned a data item, the screen location field populated with a screen location value representative of the location on the graphical user interface of a visual representation of each category. The method further includes populating an end user name field and an end user email address field for one or more end users in the user administration interface and assigning an end user identification, an end user password and an end user role to each of the one or more end users in the user administration interface. In one embodiment, the method further includes generating, using the deck administration interface, one or more sets of one or more data items to be analyzed and assigning, using the deck administration interface, one or more end users to the one or more sets of one or more data items to be analyzed.

A system, as well as articles that include a machine-readable medium storing machine-readable program code for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

FIG. 9 is a screen diagram of an exemplary interface tool used to evaluate and classify data items illustrating a post-classification view;

FIG. 15 is a screen diagram of an exemplary report outlining exemplary classification statistics and results from the exemplary interface tool.

Like reference symbols in the various drawings indicate like elements.

DETAILED DESCRIPTION

In the following description, reference is made to the accompanying drawings that form a part hereof, and in which is shown by way of illustration specific embodiments in which the disclosure may be practiced. It is to be understood that other embodiments may be utilized and structural changes may be made without departing from the scope of the present disclosure.

Figure 1:
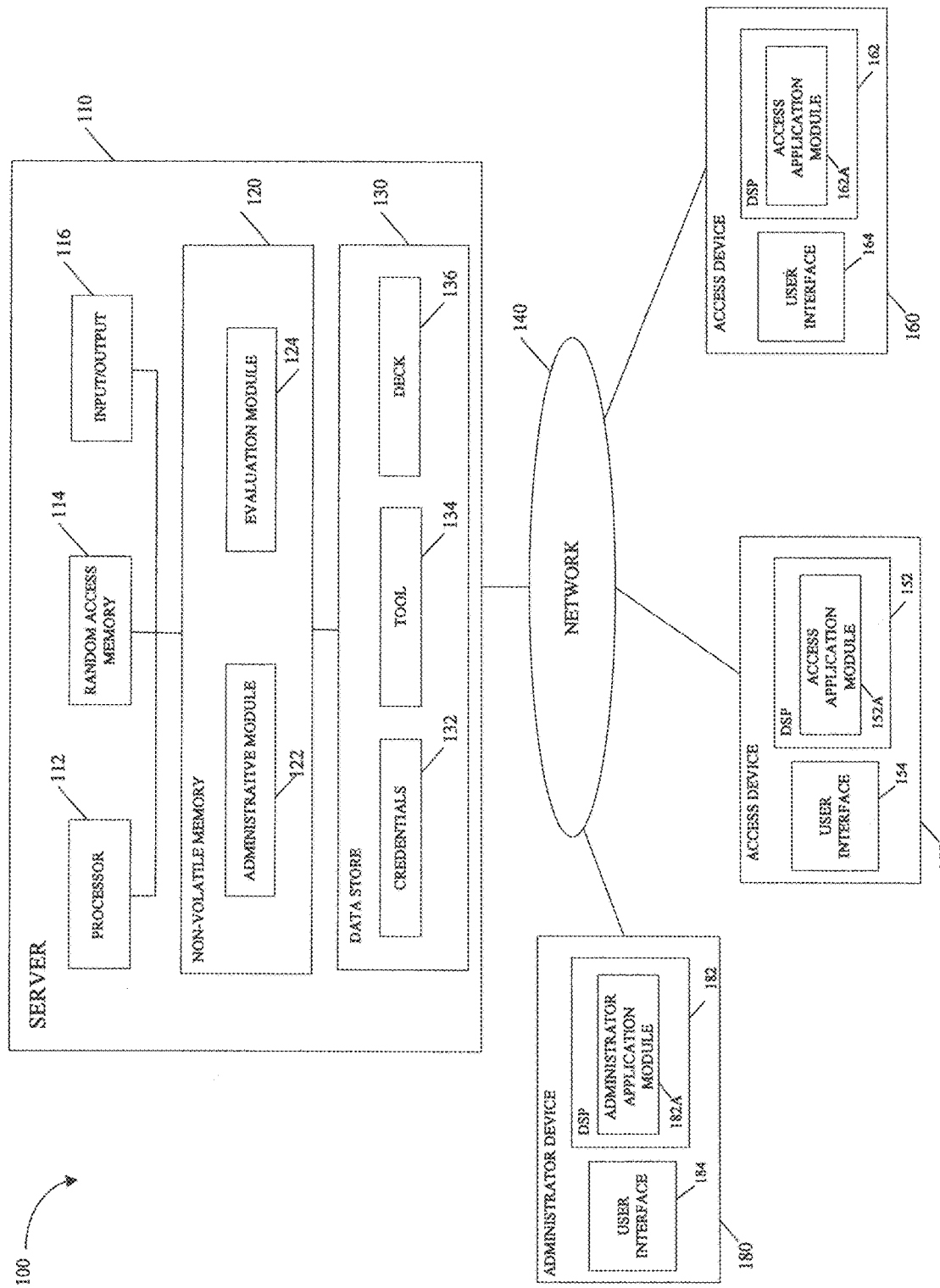
FIG. 1 is a schematic depicting an exemplary computer-based system for evaluating and classifying data items.

Turning now to FIG. 1, an example of a suitable computing system 100 within which embodiments of the disclosure may be implemented is presented. The computing system 100 is only one example and is not intended to suggest any limitation as to the scope of use or functionality of the disclosure. Neither should the computing system 100 be interpreted as having any dependency or requirement relating to any one or combination of illustrated components.

For example, the present disclosure is operational with numerous other general purpose or special purpose computing consumer electronics, network PCs, minicomputers, mainframe computers, laptop computers, as well as distributed computing environments that include any of the above systems or devices, and the like.

The disclosure may be described in the general context of computer-executable instructions, such as program modules, being executed by a computer. Generally, program modules include routines, programs, objects, components, data structures, loop code segments and constructs, and other computer instructions known to those skilled in the art that perform particular tasks or implement particular abstract data types. The disclosure can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art may implement the description and figures as processor executable instructions, which may be written on any form of a computer readable media.

In one embodiment, with reference to FIG. 1, the system 100 includes a server device 110 configured to include a processor 112, such as a central processing unit ("CPU"), random access memory ("RAM") 114, one or more input-output devices 116, such as a display device (not shown) and keyboard (not shown), non-volatile memory 120 and data store 130, all of which are interconnected via a common bus and controlled by the processor 112.

As shown in the FIG. 1 example, in one embodiment, the non-volatile memory 120 is configured to include an administrative module 122 and an evaluation module 124. The administrative module 122 is used to verify the administrator and allow access to the system 100, as well as to generate sets of data items (referred to herein as "decks" or "decks of cards"), assign those decks to end user reviewers and to generate summary reports and provides finalized categorization assignments to data items. The evaluation module 124 is used to receive swipe identification signals corresponding to end users' assignment of a category to a data item, store records of the category assignments to within an index in memory, as well as generate revised visual representations reflecting the categorization. Additional details of modules 122 and 124 are discussed in connection with FIGS. 3-14.

As shown in FIG. 1, in one embodiment, a network 140 is provided that can include various devices such as routers, server, and switching elements connected in an Intranet, Extranet or Internet configuration. In one embodiment, the network 140 uses wired communications to transfer information between access devices 150 and 160, the server device 110, the data store 130 and an administrative device 180. In another embodiment, the network 140 employs wireless communication protocols to transfer information between the access devices 150 and 160, the server device 110, the data store 130 and the administrative device 180. For example, the network 140 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LIE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 140 may also be a Wide Area Network (WAN), such as the Internet, which employs one or more transmission protocols, e.g. TCP/IP. As another example, the network 140 may employ a combination of digital cellular standards and transmission protocols. In yet other embodiments, the network 140 may employ a combination of wired and wireless technologies to transfer information between the access devices 150 and 160, the server device 110, the data store 130 and the administrative device 180.

The data store 130 is a repository that maintains and stores information utilized by the before-mentioned modules 122 and 124. In one embodiment, the data store 130 is a relational database. In another embodiment, the data store 130 is a directory server, such as a Lightweight Directory Access Protocol ("LDAP"). In yet another embodiment, the data store 130 is an area of non-volatile memory 120 of the server device 110.

In one embodiment, as shown in the FIG. 1 example, the data store 130 includes a credentials data store 132, a tool data store 134 and a deck data store 136. According to one embodiment, the credentials data store maintains logon credentials for administrators and end users. In one embodiment, the tool data store 134 maintains the evaluation tool, also referred herein as the administration interface tool. The deck data store 136 maintains the one or more sets of data items, also referred to as "decks" or "decks of cards," that need to be reviewed and evaluated, as well as those decks that have been evaluated and categorized along with a corresponding index outlining the categorized data items with their associated categories, labels and color-coding. In one embodiment, the deck data store 136 maintains the categorized set of data items in a structured data store, such as a relational or hierarchal database.

Although the data store 130 shown in FIG. 1 is connected to the network 140, it will be appreciated by one skilled in the art that the data store 130 and/or any of the information shown therein, can be distributed across various servers and be accessible to the server 110 over the network 140; be coupled directly to the server 110; be configured as part of server 110 and interconnected to processor 112, RAM 114, the one or more input-output devices 116 and the non-volatile memory 120 via the common bus; or be configured in an area of non-volatile memory 120 of the server 110.

The access devices 150 and 160, according to one embodiment, are general purpose or special purpose computing devices comprising: a touch-sensitive graphical user interface ("GUI"), GUI 154 and GUI 164, respectively; a digital signal processor ("DSP"), DSP 152 and DSP 162, respectively; each DSP having an access application module that allows a user to access the server 110, access application module 152A and access application module 162A, respectively; transient and persistent storage devices (not shown); an input/output subsystem (not shown); and a bus to provide a communications path between components comprising the general purpose or special purpose computer (not shown). According to one embodiment, access application module 152A and access application module 162A are web-based and use thin client applications (not shown), such as a web browser, which allows a user to access the server 110. Examples of web browsers are known in the art, and include well-known web browsers such as such as MICROSOFT® INTERNET EXPLORER®, GOOGLE CHROME™, MOZILLA FIREFOX® AND APPLE® SAFARI®. According to another embodiment, access devices 150 and 160, are mobile electronic devices, each having GUI, a DSP having an access application module, internal and external storage components; a power management system; an audio component; audio input/output components; an image capture and process system; RF antenna; and a subscriber identification module (SIM) (not shown). Although system 100 is described generally herein as comprising two separate access devices, access devices 150 and 160, it should be appreciated that the present invention does not require at least two separate access devices, nor is it limited to solely two access devices. Indeed, system 100 can include a single access device, such as access device 150 or access device 160, or multiple access devices.

The administrator device 180, according to one embodiment, is a general purpose or special purpose computing device comprising a touch-sensitive GUI 184, a DSP 182 having an administrator application module 182A that allows a user to access the server 110, transient and persistent storage devices (not shown), an input/output subsystem (not shown) and a bus to provide a communications path between components comprising the general purpose or special purpose computer (not shown). According to one embodiment, administrator application module 182A is web-based and uses a thin client application (not shown), such as a web browser, which allows a user to access the server 110. Examples of web browsers are known in the art, and include well-known web browsers such as such as MICROSOFT® INTERNET EXPLORER®, GOOGLE CHROME™, MOZILLA FIREFOX AND APPLE® SAFARI®. According to another embodiment, administrator device 180 is a mobile device having a GUI (not shown), a digital signal processor with an application module (not shown), internal and external storage components (not shown), a power management system (not shown), an audio component (not shown), audio input/output components (not shown), an image capture and process system (not shown), RF antenna (not shown), and a subscriber identification module (SIM) (not shown).

Further, it should be noted that the system 100 shown in FIG. 1 is only one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input and requests are communicated to the computing device via an input device, such as a keyboard and/or mouse. Data output of the system is communicated from the computing device to a display device, such as a computer monitor. According to one embodiment, data output includes one or more of computed significance scores, classifications assigned to the data sets under review, identification of the reviewers who assigned the classification, confidence scores of the reviewers, average scores of the assignments made by a set of reviewers, and scores based on the degrees of agreement between the human and application classifications.

Figure 2:
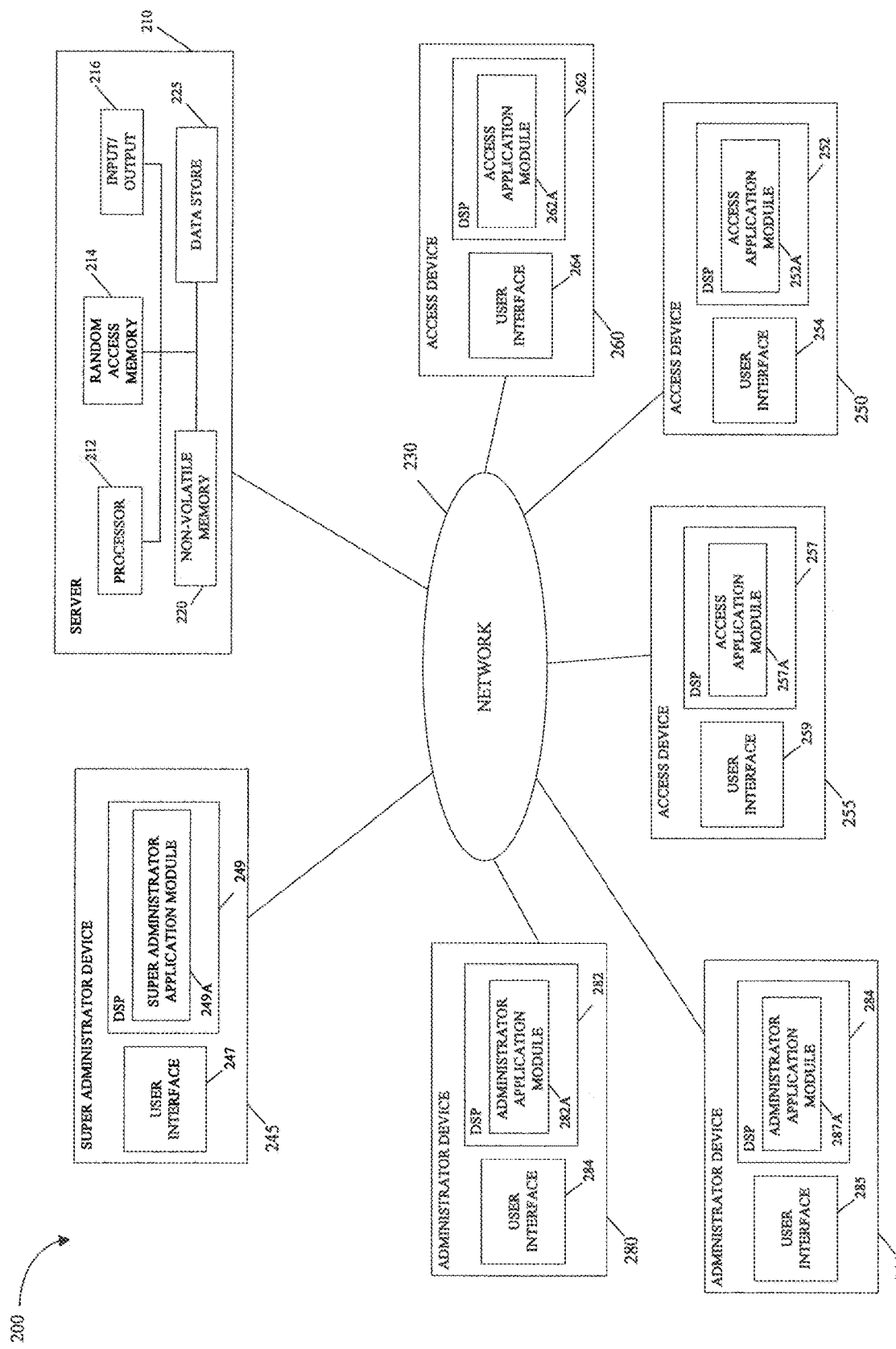
FIG. 2 is a schematic depicting an exemplary computer-based system for evaluating and classifying data items.

Turning now to FIG. 2, an example of a suitable computing system 200 within which embodiments of the disclosure may be implemented is presented. Specifically, FIG. 2 illustrates another embodiment of the present inventive system that utilizes a three tier hierarchal structure involving a super-administrator, administrators and reviewers as compared to the system illustrated in FIG. 1 that utilizes a two tier system of administrators and reviewers. It should be noted that the super-administrator and administrators of system 200 serve in the same role as the administrator of system 100 with the caveat that the super-administrator and administrators may each have discrete portions of the overall roles served by the administrator of system 100. Further, the computing system 200 is another exemplary embodiment and is not intended to suggest any limitation as to the scope of use or functionality of the disclosure. Neither should the computing system 200 be interpreted as having any dependency or requirement relating to any one or combination of illustrated components. For example, the present disclosure is operational with numerous other general purpose or special purpose computing consumer electronics, network PCs, minicomputers, mainframe computers, laptop computers, as well as distributed computing environments that include any of the above systems or devices, and the like.

According to one embodiment, the system 200 includes a server device 210 configured to include a processor 212, such as a central processing unit ("CPU"), random access memory ("RAM") 214, one or more input-output devices 216, such as a display device (not shown) and keyboard (not shown), non-volatile memory 220 and data store 225, all of which are interconnected via a common bus and controlled by the processor 212. Additional details of non-volatile memory 220 and data store 225 are discussed in connection with FIGS. 2-14.

As shown in FIG. 2, in one embodiment, a network 230 is provided that can include various devices such as routers, servers, and switching elements connected in an Intranet, Extranet or Internet configuration. In one embodiment, the network 230 uses wired communications to transfer information between access devices 250, 255 and 260, the server device 210, the data store 225, administrator devices 280 and 281 and a super-administrator device 245. In another embodiment, the network 230 employs wireless communication protocols to transfer information between the access devices 250, 255 and 260, the server device 210, the data store 225, the administrator devices 280 and 281 and the super-administrator device 245. For example, the network 230 may be a cellular or mobile network employing digital cellular standards including but not limited to the 3GPP, 3GPP2 and AMPS family of standards such as Global System for Mobile Communications (GSM), General Packet Radio Service (GPRS), CDMAOne, CDMA2000, Evolution-Data Optimized (EV-DO), LTE Advanced, Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). The network 230 may also be a Wide Area Network (WAN), such as the Internet, which employs one or more transmission protocols, e.g. TCP/IP. As another example, the network 230 may employ a combination of digital cellular standards and transmission protocols. In yet other embodiments, the network 230 may employ a combination of wired and wireless technologies to transfer information between the access devices 250, 255 and 260, the server device 210, the data store 225, the administrator devices 280 and 281 and the super-administrator device 245.

The data store 225 is a repository that maintains and stores information utilized by the before-mentioned modules 122 and 124. In one embodiment, the data store 225 is a relational database. In another embodiment, the data store 225 is a directory server, such as a Lightweight Directory Access Protocol ("LDAP"). In yet another embodiment, the data store 225 is an area of non-volatile memory 220 of the server device 210.

Although the data store 225 shown in FIG. 2 is connected to the network 230, it will be appreciated by one skilled in the art that the data store 225 and/or any of the information shown therein, can be distributed across various servers and be accessible to the server 210 over the network 230; be coupled directly to the server 210; be configured as part of server 210 and interconnected to processor 212, RAM 214, the one or more input-output devices 216 and the non-volatile memory 220 via the common bus; or be configured in an area of non-volatile memory 220 of the server 210.

The access devices 250, 255 and 260, according to one embodiment, are general purpose or special purpose computing devices comprising: a touch-sensitive graphical user interface ("GUI"), GUI 254, GUI 259 and GUI 264, respectively; a digital signal processor ("DSP"), DSP 252, DSP 257 and DSP 262, respectively; each DSP having an access application module that allows a user to access the server 210, access application module 252A, access application module 257A and access application module 262A, respectively; transient and persistent storage devices (not shown); an input/output subsystem (not shown); and a bus to provide a communications path between components comprising the general purpose or special purpose computer (not shown). According to one embodiment, access application module 252A, access application module 257A and access application module 262A are web-based and use thin client applications (not shown), such as a web browser, which allows a user to access the server 210. Examples of web browsers are known in the art, and include well-known web browsers such as such as MICROSOFT® INTERNET EXPLORER®, GOOGLE CHROME™, MOZILLA FIREFOX® AND APPLE® SAFARI®. According to another embodiment, access devices 250, 255 and 260, are mobile electronic devices, each having GUI, a DSP having an access application module, internal and external storage components; a power management system; an audio component; audio input/output components; an image capture and process system; RF antenna; and a subscriber identification module (SIM) (not shown). Although system 200 is described generally herein as comprising three separate access devices, access devices 250, 255 and 260, it should be appreciated that the present invention does not require at least three separate access devices, nor is it limited to solely three access devices. Indeed, system 200 can include a single access device, such as access device 250, access device 255 or access device 260, or multiple access devices.

The administrator devices 280 and 281, according to one embodiment, are general purpose or special purpose computing devices each comprising a touch-sensitive graphical user interface, GUI 284 and GUI 285, respectively; a digital signal processor, DSP 282 and DSP 284, respectively; each DSP having an access application module that allows a user to access the server 210, administrator application module 282A and administrator application module 287A, respectively; transient and persistent storage devices (not shown), an input/output subsystem (not shown) and a bus to provide a communications path between components comprising the general purpose or special purpose computer (not shown). According to one embodiment, administrator application modules 282A and 287A are web-based and use a thin client application (not shown), such as a web browser, which allows a user to access the server 210. Examples of web browsers are known in the art, and include well-known web browsers such as such as MICROSOFT® INTERNET EXPLORER®, GOOGLE CHROME™, MOZILLA FIREFOX® and APPLE® SAFARI®. According to another embodiment, administrator devices 280 and 281 are mobile devices each having a GUI (not shown), a digital signal processor with an application module (not shown), internal and external storage components (not shown), a power management system (not shown), an audio component (not shown), audio input/output components (not shown), an image capture and process system (not shown), RF antenna (not shown), and a subscriber identification module (SIM) (not shown).

The super-administrator device 245, according to one embodiment, is a general purpose or special purpose computing device comprising a touch-sensitive graphical user interface 247, a DSP 249 having a super-administrator application module 249A that allows a user to access the server 210, transient and persistent storage devices (not shown), an input/output subsystem (not shown) and a bus to provide a communications path between components comprising the general purpose or special purpose computer (not shown). According to one embodiment, the super-administrator application module 249A is web-based and uses a thin client application (not shown), such as a web browser, which allows a user to access the server 210. Examples of web browsers are known in the art, and include well-known web browsers such as such as Microsoft® Internet Explorer®, Google Chrome™, Mozilla Firefox® and Apple® Safari®. According to another embodiment, the super-administrator device 245 is a mobile device having a GUI (not shown), a digital signal processor with an application module (not shown), internal and external storage components (not shown), a power management system (not shown), an audio component (not shown), audio input/output components (not shown), an image capture and process system (not shown), RF antenna (not shown), and a subscriber identification module (SIM) (not shown).

Further, it should be noted that the system 200 shown in FIG. 2 is only one embodiment of the disclosure. Other system embodiments of the disclosure may include additional structures that are not shown, such as secondary storage and additional computational devices. In addition, various other embodiments of the disclosure include fewer structures than those shown in FIG. 2. For example, in one embodiment, the disclosure is implemented on a single computing device in a non-networked standalone configuration. Data input and requests are communicated to the computing device via an input device, such as a keyboard and/or mouse. Data output of the system is communicated from the computing device to a display device, such as a computer monitor. According to one embodiment, data output includes one or more of computed significance scores, classifications assigned to the text spans under review, identification of the reviewers who assigned the classification, confidence scores of the reviewers, average scores of the assignments made by a set of reviewers, and scores based on the degrees of agreement between the human and application classifications.

Figure 3:
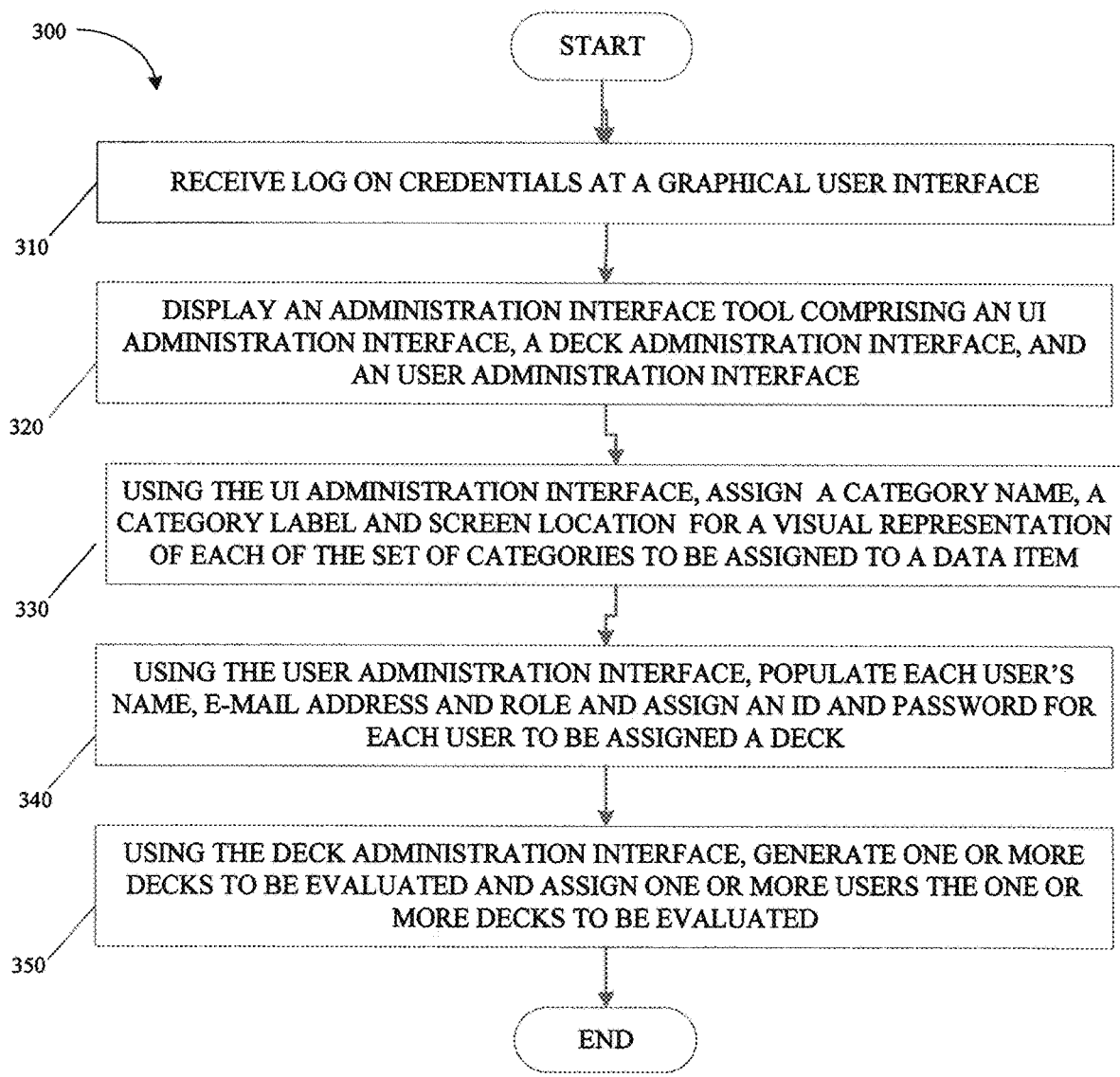
FIG. 3 is a flow diagram illustrating an exemplary computer-implemented method for evaluating and classifying data items.

Turning now to FIG. 3, an exemplary method 300 for generating and assigning parameters for the evaluation tool is disclosed in the context of system 100 of FIG. 1. It should be noted that the exemplary methodology of FIG. 3, as well as the methodology and details discussed in conjunction with FIGS. 4-13, can also incorporated within the context of system 200, wherein the super-administrator and administrators of system 200 serve in the same role as the administrator of system 100 with the caveat that the super-administrator and administrators may each have discrete portions of the overall roles served by the administrator of system 100.

Figure 4:
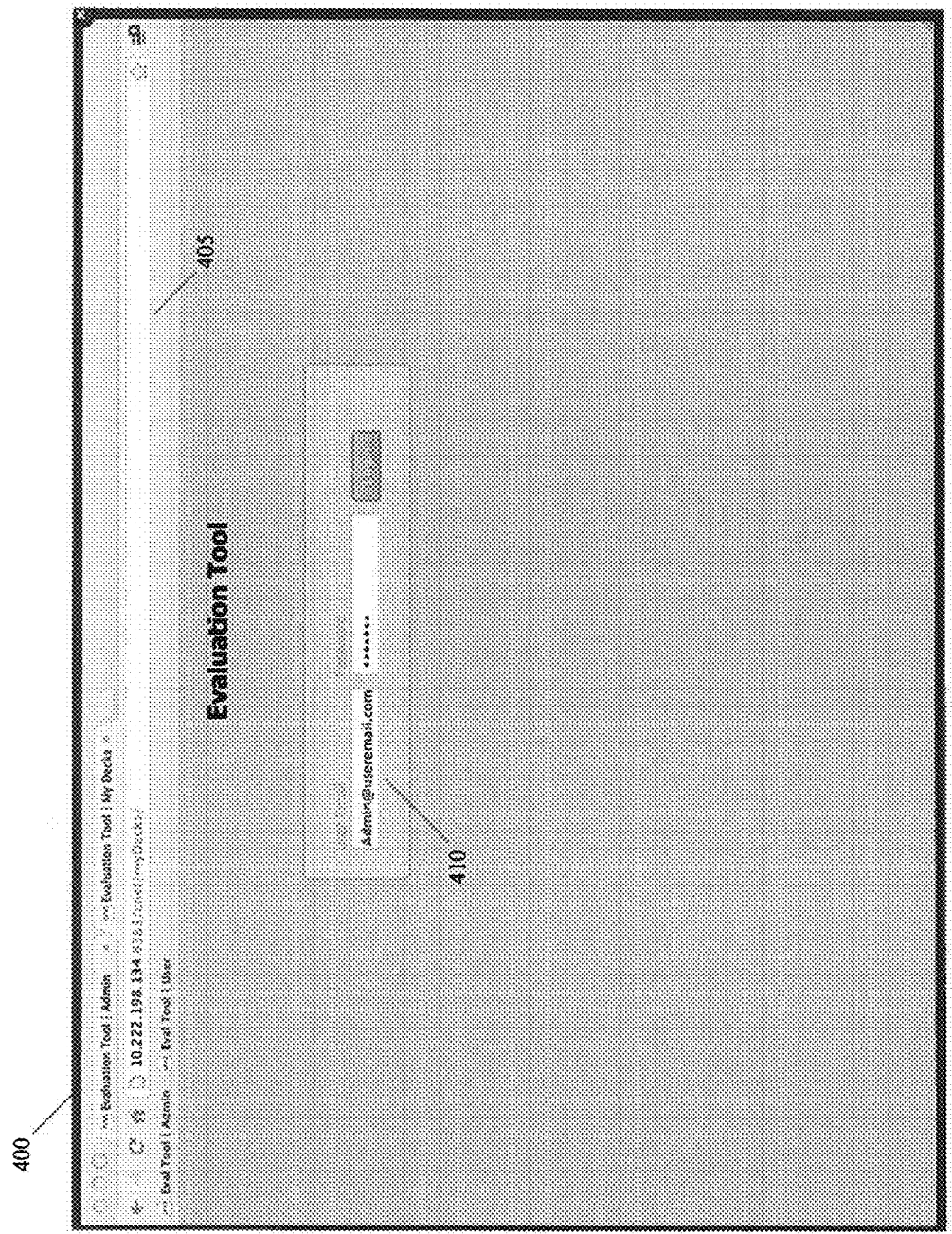
FIG. 4 is a screen diagram of an exemplary website portal for a tool used to evaluate and classify data items.

Referring back to the illustrated embodiment shown in FIG. 3, log on credentials are received at graphical user interface of the administrator device 180, step 310. In one embodiment of the inventive concept, an administrator is designated with certain access and editing rights, and receives a user name and password, which are stored in the credentials database 132 that are accessible by the administrative module 122 to verify the administrator and allow access to the system 100. The administrator then accesses the server 110 via a website portal on the GUI 184, by entering the username and password, which are subsequently compared by the administrator module 122 to the administrator information stored in the Credentials database 132. FIG. 4 illustrates an exemplary website portal 400 in which the administrator's e-mail and password 410 are required.

Figure 5:
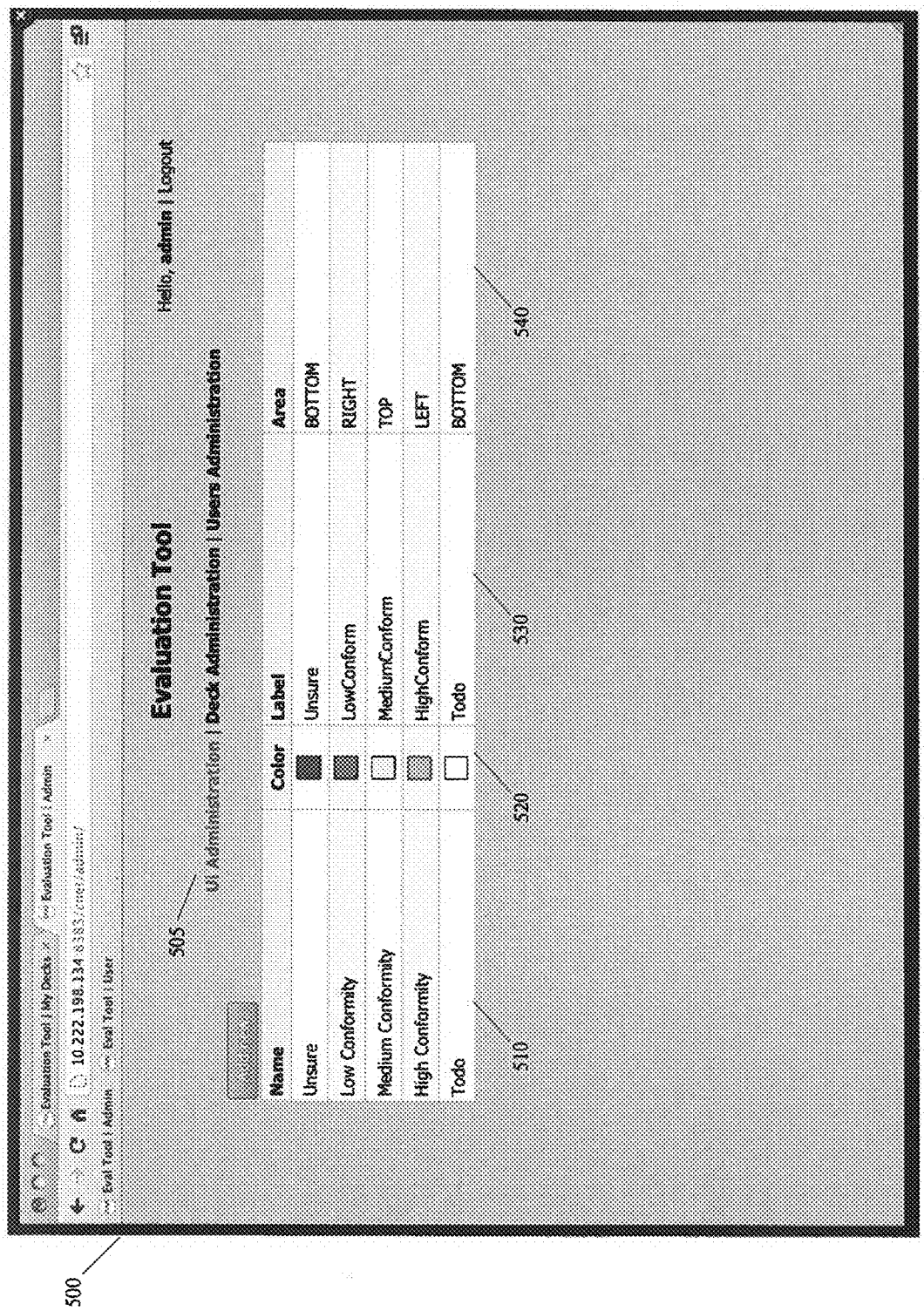
FIG. 5 is a screen diagram of an exemplary UI Administration interface tool used to evaluate and classify data items.
Figure 6:
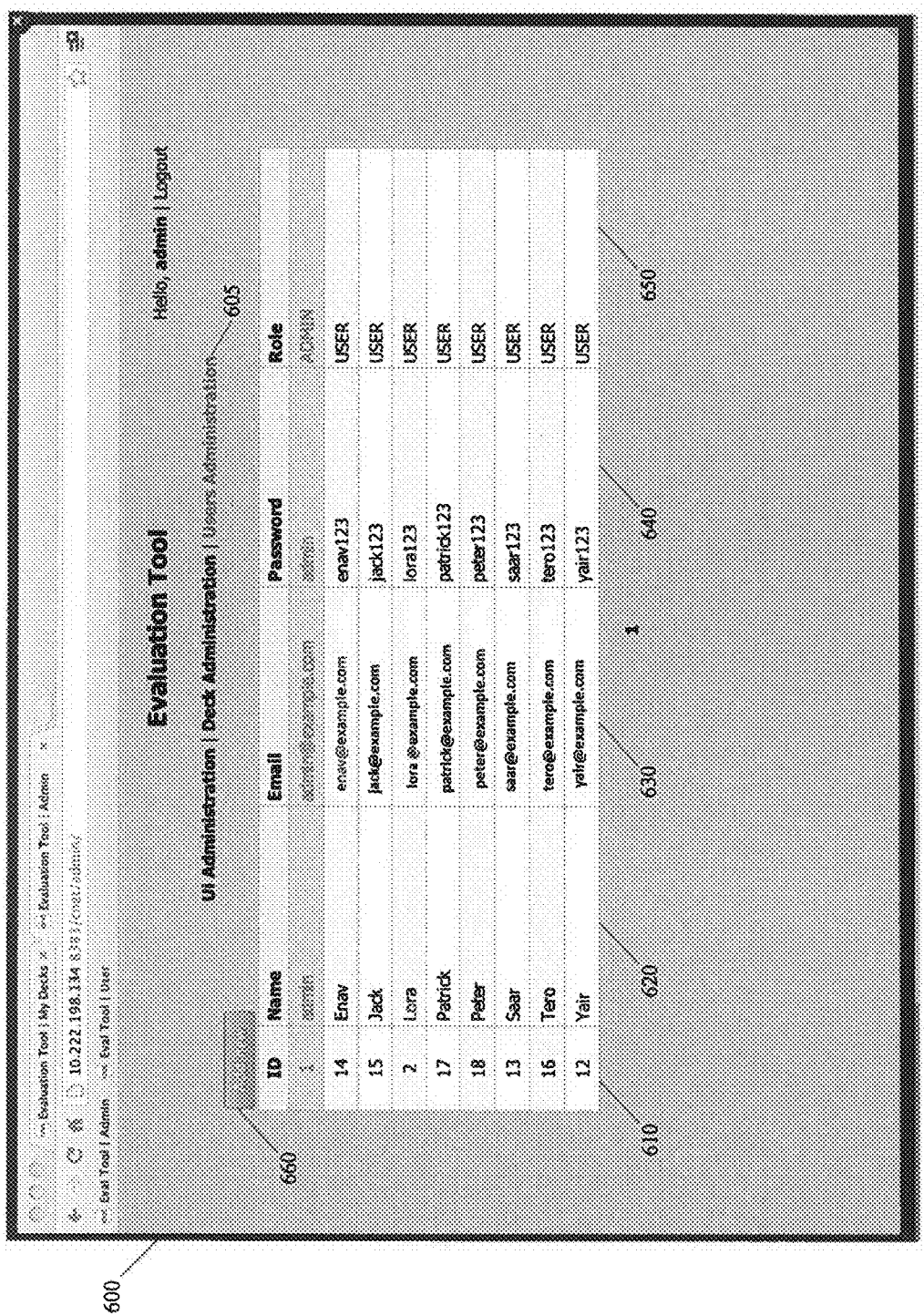
FIG. 6 is a screen diagram of an exemplary User Administration interface tool used to evaluate and classify data items.
Figure 13:
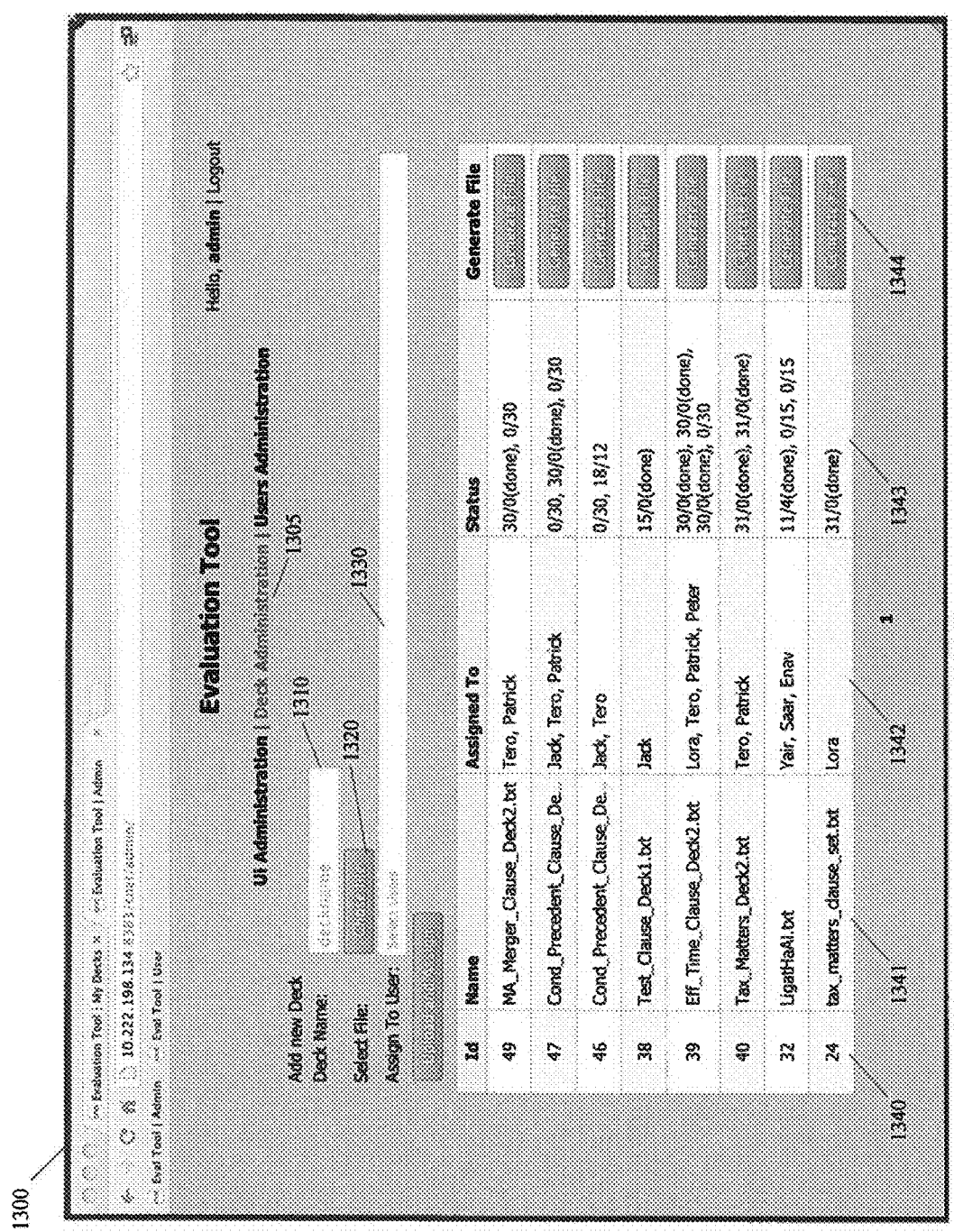
FIG. 13 is a screen diagram of an exemplary administration interface tool used to evaluate and classify data items.
Figure 14:
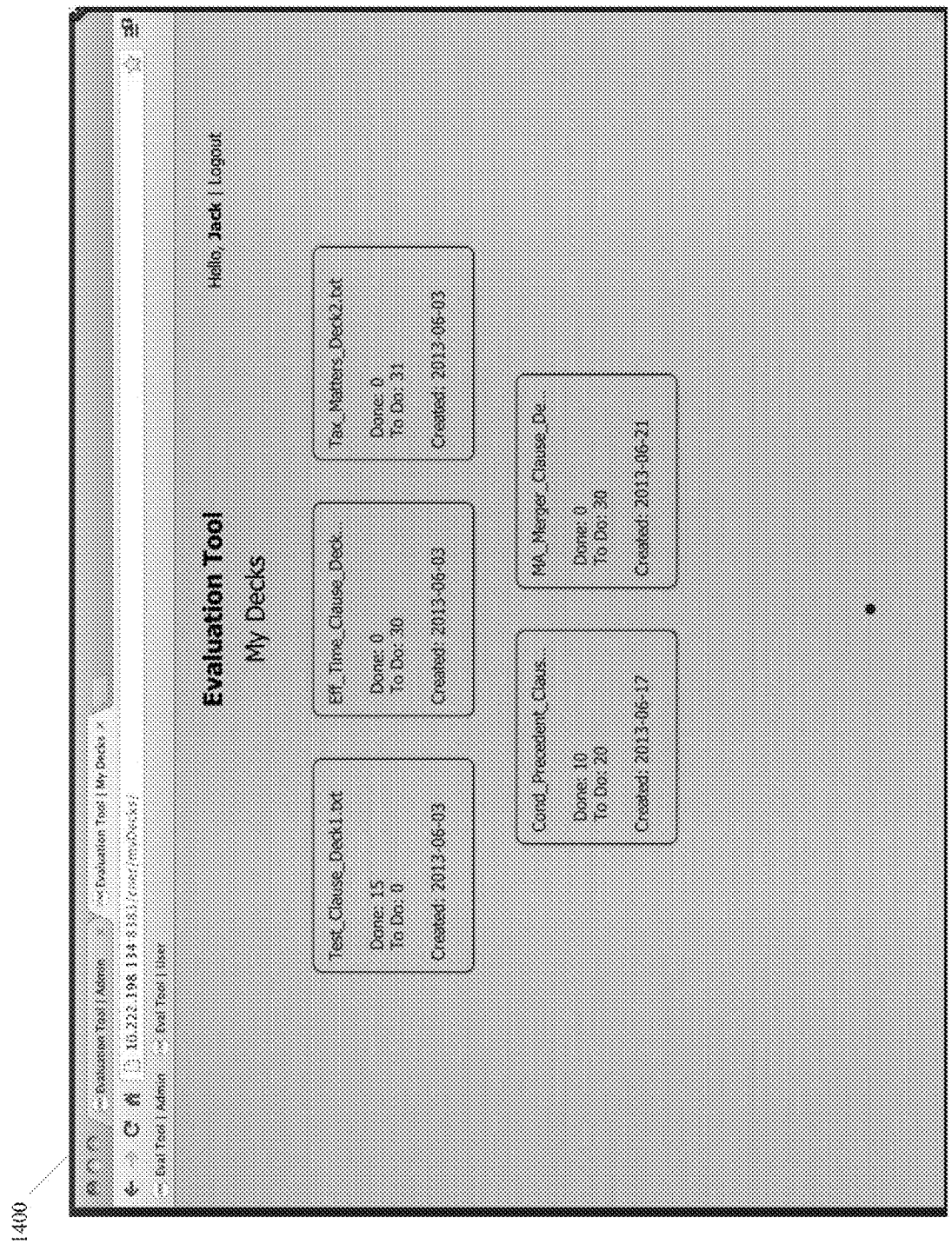
FIG. 14 is a screen diagram of an exemplary interface tool used to evaluate and classify data items illustrating a user's assigned tasks.

If the username and password combination are valid, the administrator module 122 directs the user to an administration interface tool maintained in the tool data store 134, step 320. According to one embodiment, the administration interface tool is a secure webpage dashboard maintained in the Tools database 134 and comprises a UI Administration Interface, a Deck Administration Interface and a User Administration Interface, which is presented to the administrator on the GUI 184. FIGS. 5, 6, and 13 illustrate an exemplary instance of the administration interface tool, wherein FIG. 5 illustrates an exemplary UI Administration Interface 500, FIG. 6 illustrates an exemplary User Administration Interface 600 and FIG. 13 illustrates an exemplary Deck Administration Interface 1300. Depending upon a user's access rights, which are defined by data stored in the Credentials database 132 and associated with the user's login information, the system 100 will allow the administrator to view and edit certain information maintained within certain fields in the Credentials database 132 pertaining to users of the access devices 150 and 160, as well as certain information maintained in the Tools database 134 pertaining to the data items to be reviewed.

Returning to step 320 of FIG. 3, the UI Administration interface of the administration interface tool is presented to the administrator on the graphical user interface 184. The administrator uses the UI Administration interface to assign a name, a label and screen location for a visual representation of each of the set of categories to be assigned to a data item, step 330. FIG. 5 illustrates an exemplary UI Administration Interface 500, wherein the administrator, after selecting the UI Administration tab 505, can input the appropriate information into a "Name" field 510 for a given category to be assigned to data items. For example, according to one embodiment, categories to be assigned to data items include "Low Conformity," "Medium Conformity," "High Conformity," "To Do," and "Unsure," which will correlate as to a reviewer's determination as to how responsive a given data item is to given topic or query. Further, for each category, the administrator can assign a color 520, a label 530 and a screen location 540 for each visual representation of each of the set of categories to be assigned to a data item, which is stored in the Tools database 134. For example, referring to FIG. 5, the category "Low Conformity" is assigned a label "LowConform," the color "Red" and the "Right Screen Location." The visual representation of each category according the parameters established in FIG. 5 is illustrated in FIGS. 8-12.

At step 340 of FIG. 3, the administrator uses the User Administration Interface of the administration interface tool to populate relevant information for each user that is to be assigned a deck to be analyzed. According to one embodiment, a deck is a collection of data items that are to be reviewed and assigned one or more categories. FIG. 6 illustrates an exemplary User Administration Interface 600 in which the administrator, after selecting the Users Administration tab 605, enters each user's: name into a "Name" field 620, e-mail address into an "Email Address" field 630 and role into a "Role" field 650. The administrator interface tool maintained in the tool data store 134 then assigns a unique identifier, in this case a numerical identifier, to each user, which is entered in the "ID" field 610. The administrator using the administrator interface tool maintained in the tool data store 134 also assigns a password to be used by the respective user in order to access the system 100, which is entered in "Password" field 640. An administrator, according to one embodiment, enters an additional user and populates the aforementioned user information by activating a button, illustrated in FIG. 6 as the "Add New" button 660. Each user's name and associated e-mail address, password, unique identifier and role are maintained in the Credentials database 132.

Returning to FIG. 3, the administrator uses the Deck Administration Interface in order to generate one or more decks to be evaluated and then assigns to each of the one or more users a deck to be evaluated, step 350. FIG. 13 illustrates an exemplary Deck Administration Interface 1300 in which the administrator, after selecting the Deck Administration tab 1305, generates a deck by populating a "deckname" field 1310 with an assigned deck name, selecting the "deck," i.e. a collection or set of data items to be analyzed, using the "Choose File" button 1320 and populating field 1330 with the name of the user (or users) the deck is to be assigned to and reviewed by. According to one embodiment, one or more decks are stored and maintained in the deck data store 136. In one embodiment, the one or more decks are generated by randomly grouping data items, such as documents or document segments, to be analyzed into identically numbered sets. For example, a thousand documents that need to be analyzed are randomly grouped into ten sets of one hundred documents. In another embodiment, the one or more decks are generated by randomly grouping documents or document segments to be analyzed into sets not to exceed a predetermined threshold value. For example, a predetermined threshold value for each set may one hundred documents and in looking to 940 documents that need to be analyzed, the documents randomly grouped into nine sets of one hundred documents and one set of forty documents. In another embodiment, the one or more decks are generated by grouping like documents according to similar characteristics, such as the same document type.

Figure 7:
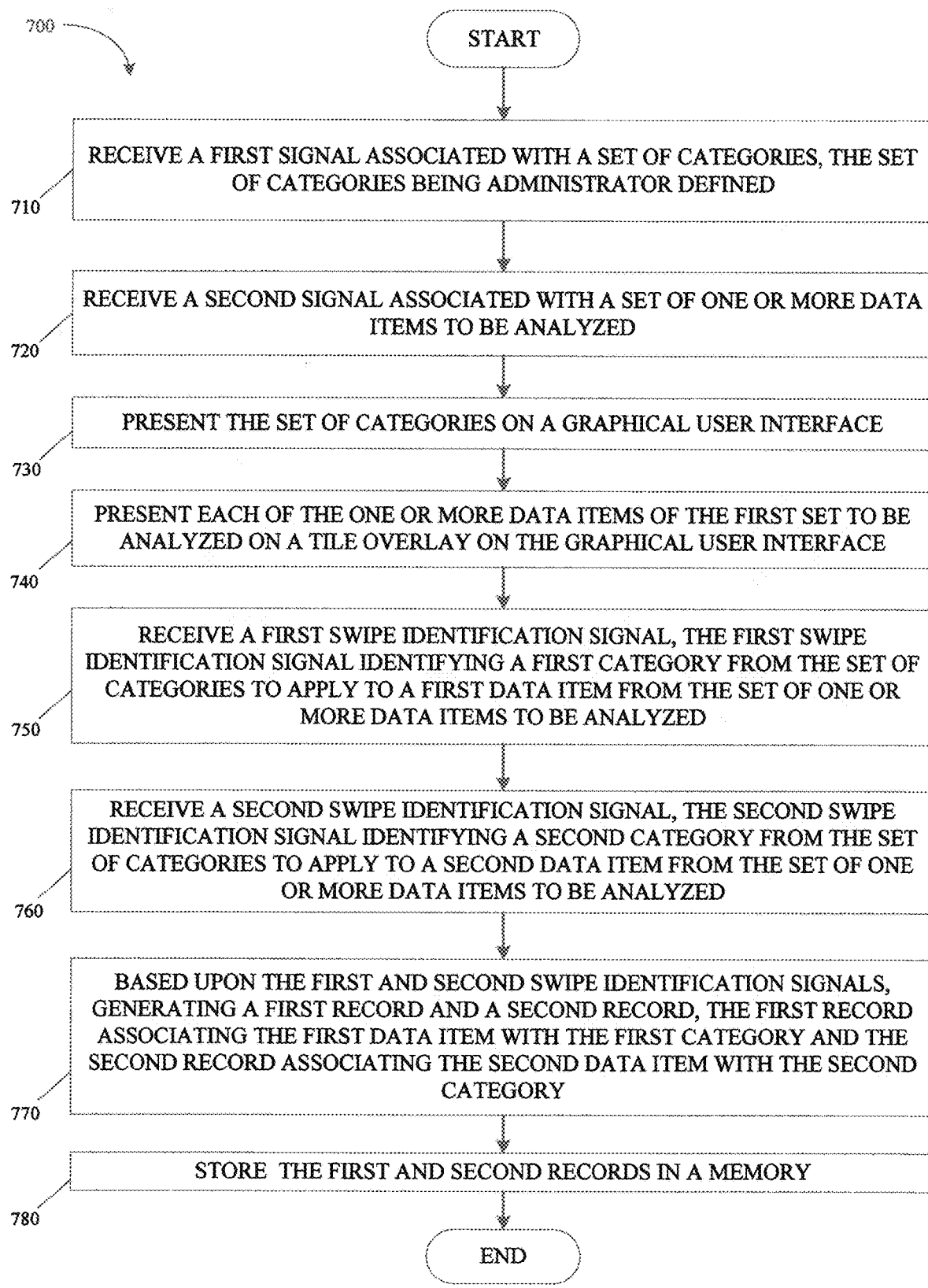
FIG. 7 is a flow diagram illustrating an exemplary computer-implemented method for evaluating and classifying data items.

Turning now to FIG. 7, an exemplary method 700 for evaluating and classifying documents and document segments is disclosed. In the illustrated embodiment shown in FIG. 7, the administrative module 122 of the server 110 receives a first signal associated with a set of categories, the set of categories being administrator defined, step 710. According to one embodiment, a designated administrator uses the UI Administration interface 500, as illustrated in FIG. 5, and inputs a name, a label and screen location for a visual representation of each of the set of categories to be assigned to a data item via the user interface 184 of the administrator device 180, which is received by the administrative module 122 of the server 110. For example, according to one embodiment, categories to be assigned to data items include "Low Conformity," "Medium Conformity," "High Conformity," "To Do," and "Unsure," which will correlate as to a reviewer's determination as to how responsive a given data item is to given topic or query. Further, for each category, the administrator can assign a label and a screen location for the visual representation of each of the set of categories to be assigned to a data item, which is stored in the Tools database 134. For example, referring to FIG. 5, the category "Low Conformity" is assigned a label "LowConform," the color "Red" and the "Right Screen Location."

At step 720, the administrative module 122 of the server 110 receives a second signal associated with a first set of one or more data items to be analyzed. According to one embodiment, the administrator uses the Deck Administration Interface 1300, as illustrated in FIG. 13 and presented via the user interface 184 of the administrator device 180, to input a deck name, select and upload the collection of data items to be analyzed, and assign one or more users to review and categorize the deck, which is received by the administrative module 122 of the server 110. For example, the Deck Administration Interface 1300 at the instruction of the administrator creates a deck named "Tax_Matters_Deck2.txt," which includes a collection of data items to be reviewed, and assigns two users, Tero and Patrick, to undertake the review.

Figure 8:
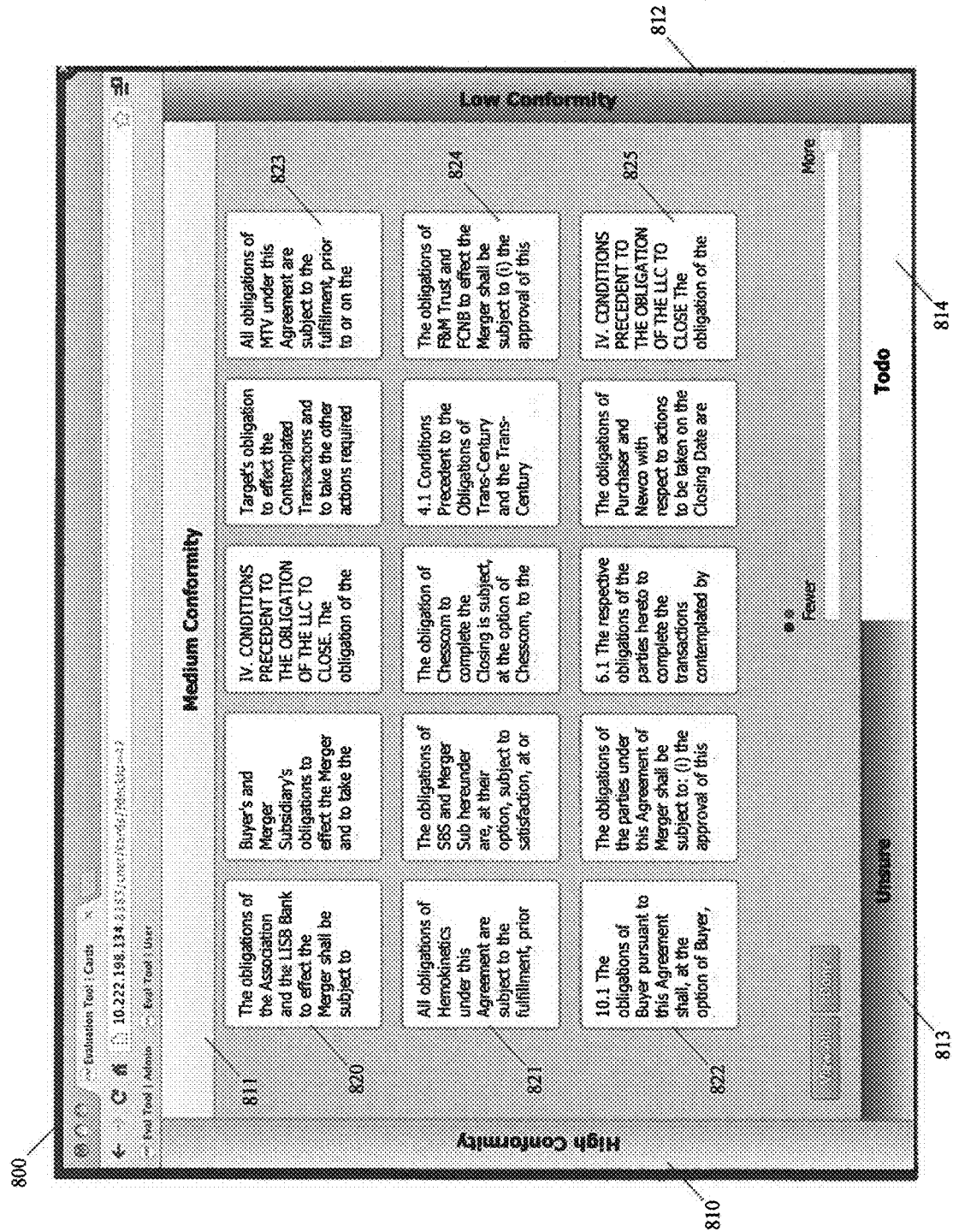
FIG. 8 is a screen diagram of an exemplary interface tool used to evaluate and classify data items illustrating a pre-classification view.

The visual representations of the set of categories are generated by the administrative module 122 and then presented on graphical user interfaces 154 and/or 164, step 730. FIG. 8 illustrates an exemplary graphical user interface 800 with a visual representation of each of the categories being displayed along the perimeter of the interface. For example, category "High Conformity" is represented by the visual representation High Conformity 810 located on the left side of the interface, which may be color coded as green. Similarly, the categories "Medium Conformity," "Low Conformity," "Unsure" and "To Do" are represented by the visual representations Medium Conformity 811, Low Conformity 812, Unsure 813 and Todo 814 located along the remainder of the perimeter of the interface, which may be color coded as yellow, red, violet and white, respectively.

At step 740, the administrative module 122 presents each of the one or more data items of the first set to be analyzed on a card or tile overlay on the graphical user interfaces 154 and 164. According to one embodiment, an end user upon providing the appropriate logon credentials is presented with one or more decks or sets of data items the reviewer is currently assigned, as illustrated by the interface 1400 in FIG. 14. FIG. 8 illustrates the exemplary graphical user interface 800 with visual representations of each of the cards or data items to be analyzed from a selected deck presented as a card or tile overlay. For example, data items 820 through 825 each represent text segments that are to be analyzed and categorized as "High Conformity," "Medium Conformity," "Low Conformity," "Unsure" and "To Do."

At step 750, the evaluation module 124 via the user interface 154 of access device 150 or user interface 164 of access device 160 receives a first swipe identification signal, the first swipe identification signal identifying a first category from the set of categories to apply to a first data item from the set of one or more data items to be analyzed. According to one embodiment, user interface 154 and user interface 164 are touch sensitive displays that can be controlled through simple or multi-touch gestures as is known in the art. In another embodiment, user interface 154 and user interface 164 are touch sensitive displays that in addition to being controlled through simple or multi-touch gestures, is also configured to be controlled through one or more peripheral devices as is known in the art. It should be understood that while the following description is described with regard to received swipe identification signals, according to one embodiment, the categorization of data item within the deck can also be performed using a combination of simple or multi-touch gestures through the touch sensitive displays and peripheral device commands.

Referring to FIG. 8, in one embodiment, a swipe identification signal is generated by an end user initiating a finger swipe gesture on a specific data item, such as data item 820, and then dragging it to the appropriate category tab of the category tabs 810-814 located along the perimeter of the screen. For example, an end user at access device 150 will review the content of data item 820, which is a text span that reads "The obligations of the Association and the LISB Bank to effect the Merger shall be subject to" and determine that it highly conforms to the end user's understanding of representative text spans associated with merger clauses that are included in this particular data set of the deck, and therefore should be categorized as "High Conformity." Accordingly, the reviewer undertakes a finger swipe gesture on data item 820 and drags the data item 820 to the left toward the "High Conformity" category tab 810 on the user interface 154 of access device 150 or user interface 164 of access device 160. The evaluation module 124 at the server 110 then receives a swipe identification signal corresponding to the user's finger swipe gesture of data item 820 to the "High Conformity" tab 810.

Similarly, at step 760, the evaluation module 124 via the user interface 154 of access device 150 or user interface 164 of access device 160 receives a second swipe identification signal, the second swipe identification signal identifying a second category from the set of categories to apply to a second data item from the set of one or more data items to be analyzed. For example, again referring to FIG. 8, an end user at access device 160 will review the content of data item 824, which is a document excerpt that reads "The obligations of F&M Trust and FCNB to effect the Merger shall be subject to (i) the approval of this" and determine that it conforms moderately to the end user's understanding of representative text spans associated with merger clauses that are included in this particular data set of the deck and therefore should be categorized as "Medium Conformity." Accordingly, the reviewer undertakes a finger swipe gesture on data item 824 and drags the data item 820 to the top toward the "Medium Conformity" category tab 811 on the user interface 164 of access device 160. The evaluation module 124 at the server 110 then receives a swipe identification signal corresponding to the user's finger swipe gesture of data item 824 to the "Medium Conformity" tab 811.

Returning to FIG. 7, based upon the first and second swipe identification signals, the evaluation module 124 generates a first record and a second record, the first record associating the first data item with the first category and the second record associating the second data item with the second category, step 770, and stores the first and second records in the deck data store 136, step 780. According to one embodiment, the evaluation module 124 stores and maintains a record of the data item and the corresponding selected category in an index format within the deck data store 130. In another embodiment, the evaluation module 124 assigns and associates a label and/or color coding to the categorized data item record within the index. Continuing from the previous example and referring to FIG. 8, the evaluation module 124 having received a first swipe identification signal that data item 820 has been categorized as "High Conformity" and that data item 824 has been categorized as "Medium Conformity," generates a record of each received signal and enters it into an index maintained in the deck data store 130. In one embodiment, the record for data item 820 would include identification for the data item, the corresponding selected category "High Conformity," and the corresponding label "HighConform." Similarly, the record for data item 824 would include identification for the data item, the corresponding selected category "Medium Conformity," and the corresponding label "MediumConform."

Figure 9:
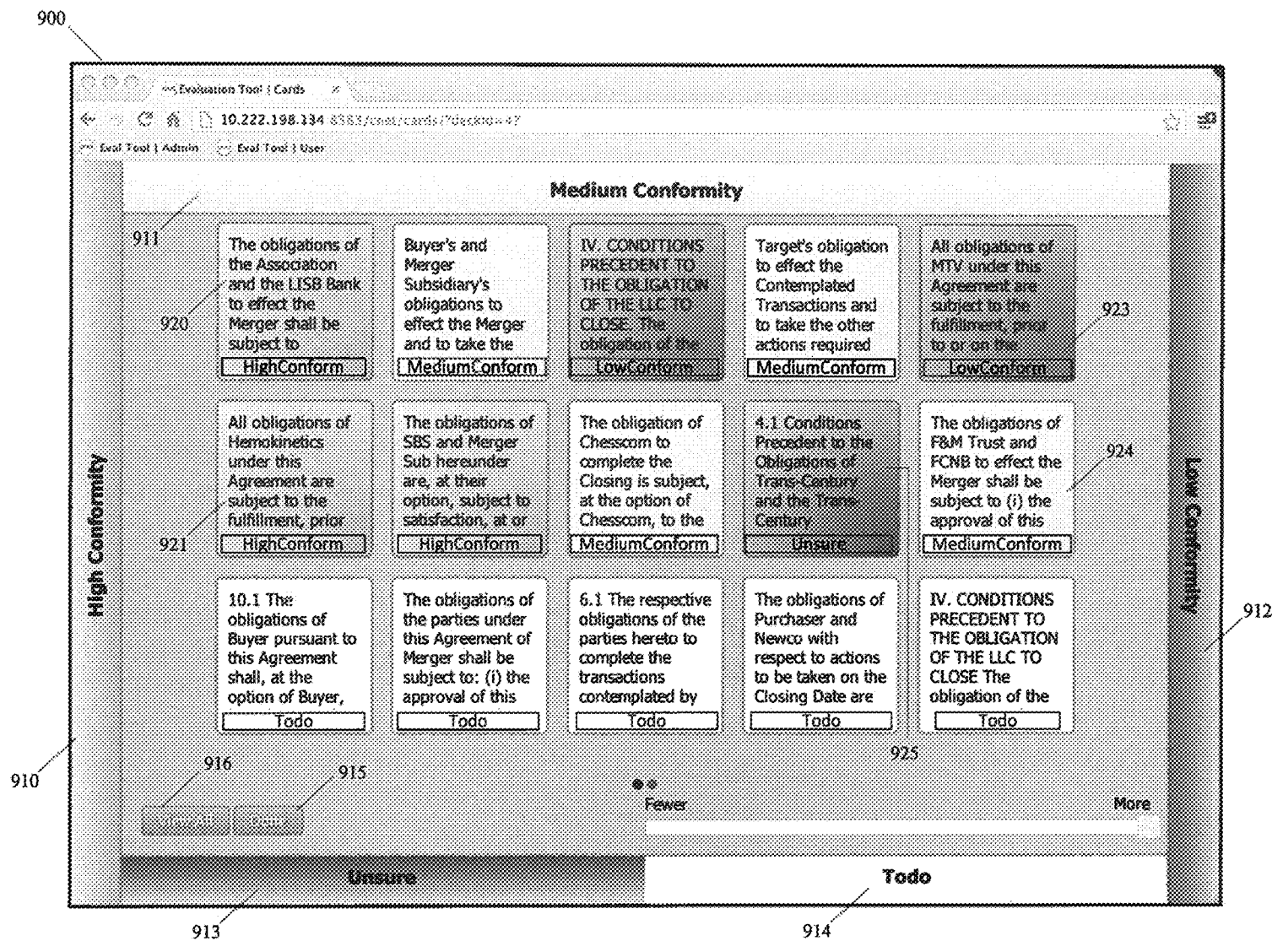
Figure 12:
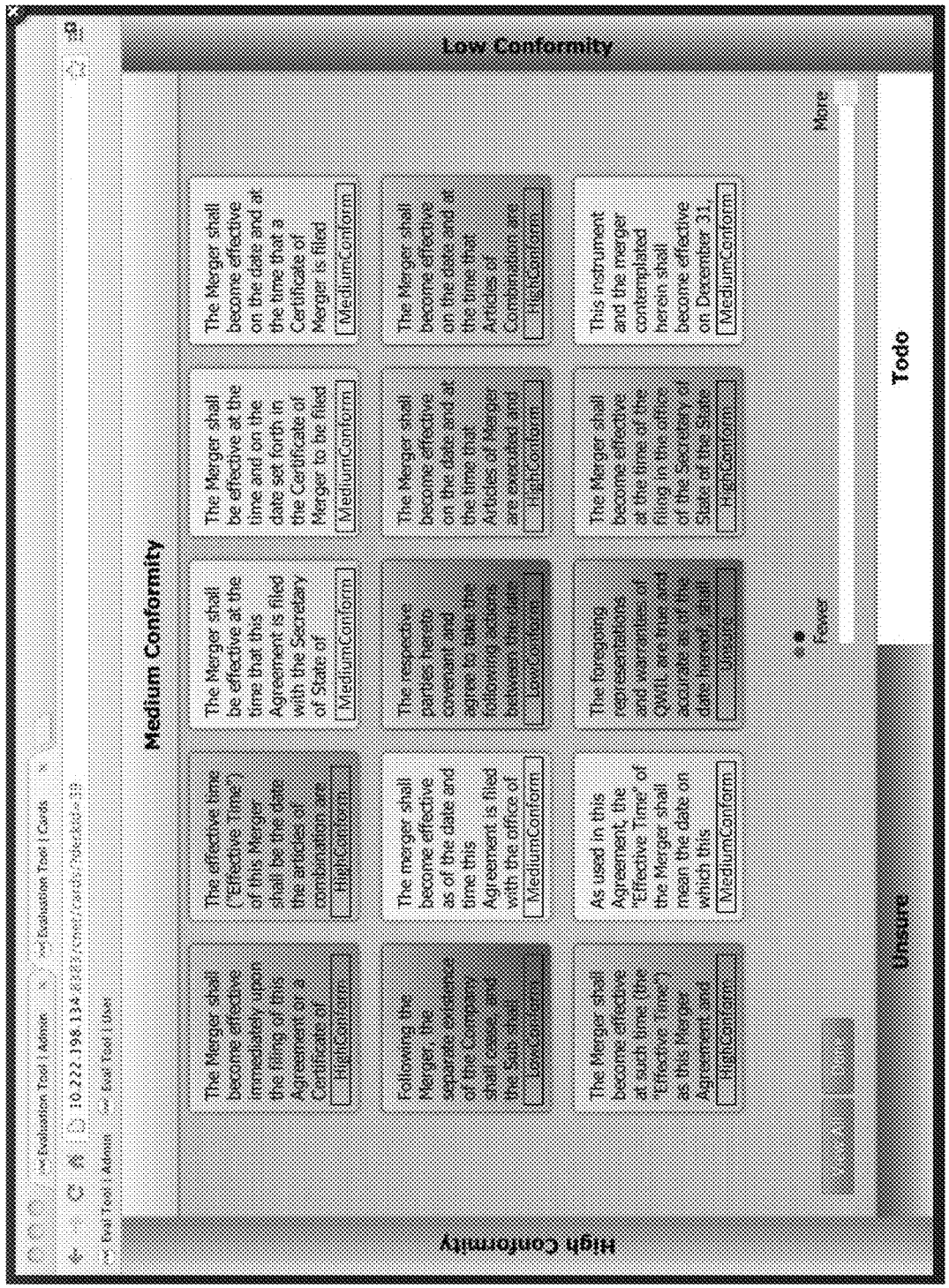
FIG. 12 is a screen diagram of an exemplary interface tool used to evaluate and classify data items illustrating a post-classification view.

According to one embodiment, subsequent to the evaluation module 124 receiving one or more swipe identification signals, the evaluation module 124 generates a modified visual representation of the data item as illustrated in FIGS. 9 and 12. For example, referring to FIG. 9, data items 920 and 924 have been categorized by the end user via the aforementioned described in relation to FIG. 7 and are representative of a revised visual representation having the associated category labels affixed to them. Specifically, for example, data item 920 of FIG. 9 is affixed with the label "HighConform" and data item 924 is affixed with the label "MediumConform." Referring again to FIG. 9, the administration interface tool, in one embodiment, further allows an end user to modify category assignments to data items prior to completing her evaluation, which is signaled by the end user by pressing the button "Done" 915. For example, referring to FIG. 9, data item 925 has been categorized as "Unsure"; prior to the end user indicating that she is done by pressing button 915, the end user can alter the category assignment by undertaking a finger swipe gesture on data item 925 and dragging it to the appropriate category tabs 910-912 located along the perimeter of the screen.

Figure 10:
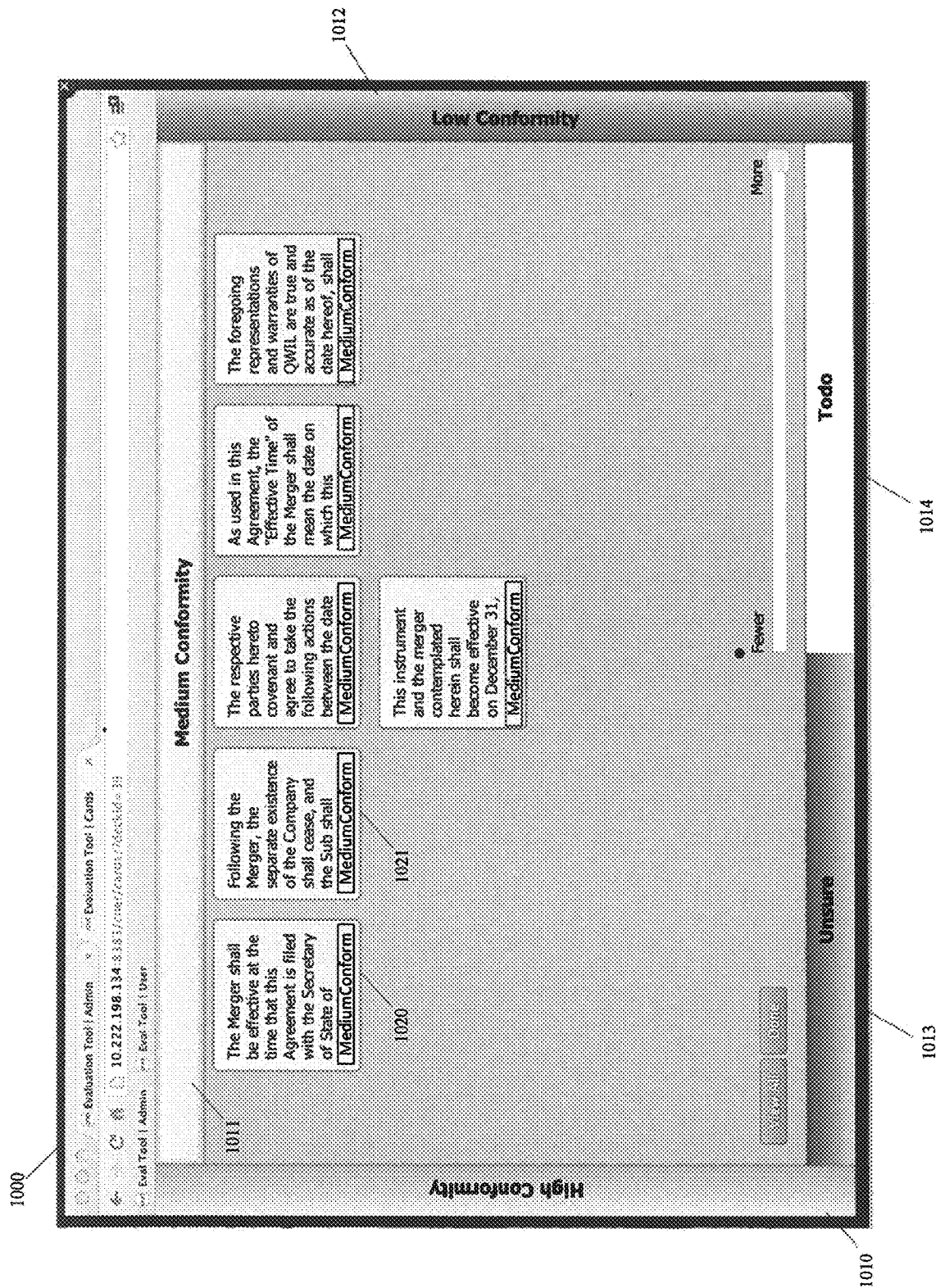
FIG. 10 is a screen diagram of an exemplary interface tool used to evaluate and classify data items illustrating a post-classification view.
Figure 11:
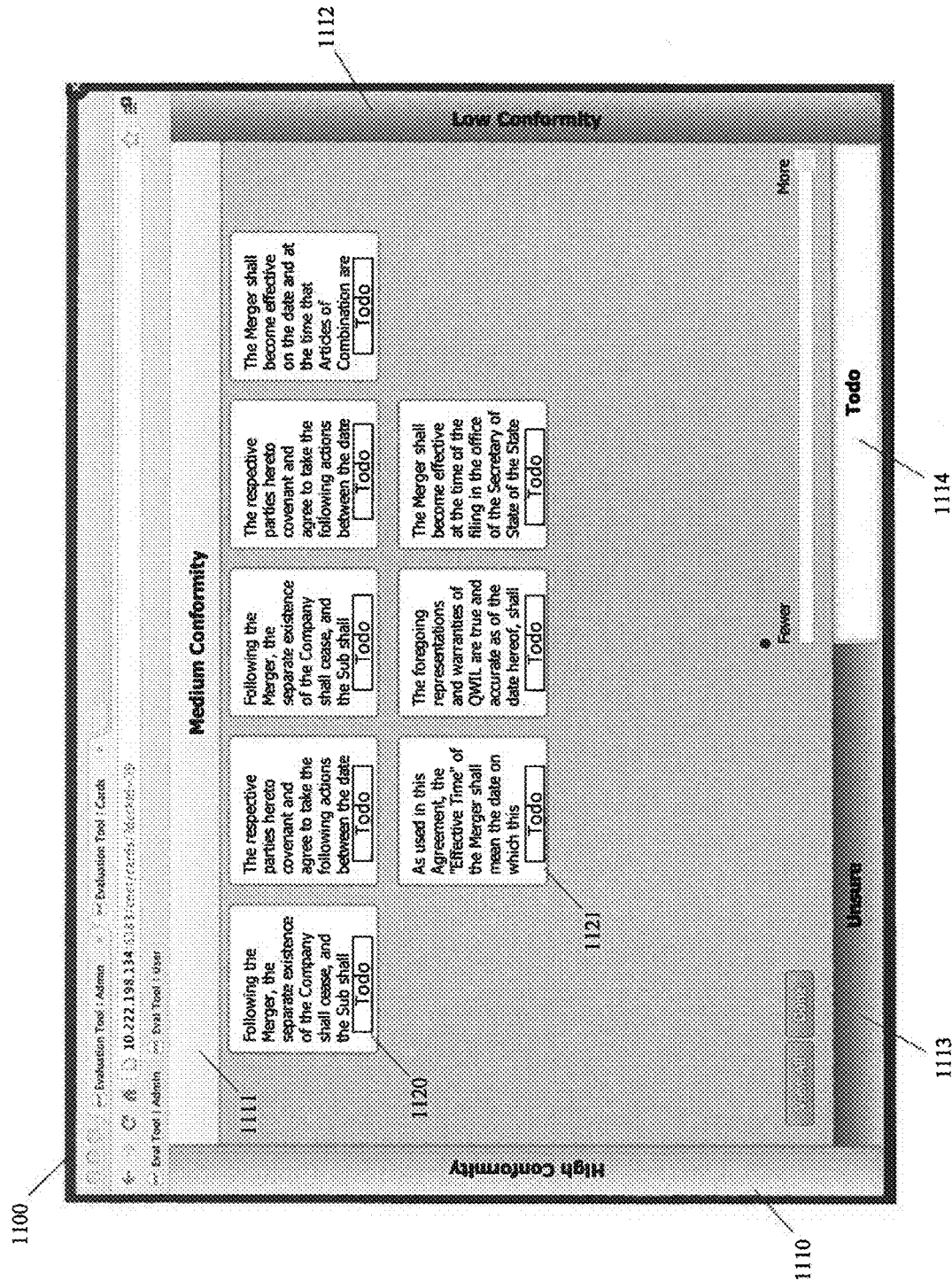
FIG. 11 is a screen diagram of an exemplary interface tool used to evaluate and classify data items illustrating a post-classification view.

In one embodiment, the evaluation tool is configured to allow an end user to view all categorized data items that have been categorized according to its assigned category. Referring to FIGS. 10 and 11, an end user can view all data items that have been evaluated and assigned a certain category by performing a touch gesture on one of the category tabs along the perimeter. For example, referring to FIG. 10, the end user using her finger touches the "Medium Conformity" tab 1011 and the evaluation module 124 receives a touch identification signal that all data items categorized as "Medium Conformity" are requested to be displayed, which prompts the evaluation module 124 to in turn to identify all data items that have been categorized as "Medium Conformity" within the index maintained in deck data store 136 and to generate and display visual representations of each such data item, as illustrated in FIG. 10. Similarly in FIG. 11, the evaluation module displays all data items that have been categorized as "To Do." In this fashion, an end user can quickly identify at any point of her evaluation what data items have been categorized, what category has been applied to the evaluated data items, as well as having the ability to categorize something with a temporary category, such as "Unsure" or "To Do" and allow the end user to return at a later time to finally categorize the data item. In another embodiment, temporary categories such as "Unsure" or "To do" are included in the end user's evaluation, which allows for an administrator or super administrator to further evaluate those categorized data items.

According to one embodiment, an administrator or super administrator is notified of data items categorized as "Unsure," for example, by review of a report generated from the administration interface tool. Referring to FIG. 13, in one embodiment, an administrator via the user interface 184 of the administrator device 184 can elect to generate a summary report of the completed evaluation of data sets or decks by pressing the button 1344 of the deck administration interface illustrated in FIG. 13, which instructs the administrative module 122 to generate the summary report from records maintained in an index in deck data store 136.

Turning now to FIG. 15, a screen diagram of an exemplary summary report outlining exemplary classification statistics and results from the interface tool is disclosed. In the embodiment shown in FIG. 15, an exemplary summary report 1500 is generated by the administrative module 122 in response to an election by an administrator who selected button 1344 of the deck administration interface illustrated in FIG. 13. According to one embodiment, the summary report 1500 is generated using a spreadsheet application as is known in the art, such as MICROSOFT® EXCEL®. In one embodiment, the summary report 1500 includes one or more classifications of each evaluated data item, along with the corresponding reviewer for each classification attributed to the data item. For example, referring to the summary report 1500, text segment 1510 has been evaluated by Reviewer 1 Lora who categorized the segment with a"Low Conformity" label at 1522, which corresponds to a class score of 1 at 1524. According to one embodiment, a class score is set by the administrator and corresponds to a given category. For example, "High Conformity" is associated with a class score of 3, "Medium Conformity" is associated with a class score of 2 and "Low Conformity" is associated with a class score of 1. Referring back to the summary report 1500, text segment 1510 has also been evaluated by Reviewer 2 Tero, who also categorized the segment with a "Low Conformity" label at 1532, which corresponds to a class score of 1 at 1534.

According to one embodiment, the administrative module 122 is configured to generate one or more statistical data points summarizing the one or more classifications assigned to each evaluated document segment. For example, as illustrated in FIG. 15, a classification average score 1540, a classification variance score 1542, a classification standard deviation score 1544 and a classification normalized average score 1546 is determined based on the three classification assigned to document segment 1510. According to one embodiment, the statistical data points can be based on analysis of individual classification scores, combined classification scores, temporal attributes of individual evaluations and combined evaluations and comparison among reviewers and with machine classification determinations.

FIGS. 1 through 15 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present disclosure have been described above, it should be understood that they have been presented by way of example, and not as limitations. It would be apparent to one skilled in the relevant art(s) that various changes in form and detail could be made therein without departing from the spirit and scope of the disclosure. Thus, the present disclosure should not be limited by any of the above-described exemplary embodiments, but should be defined only in accordance with the following claims and their equivalents.

What we claim is:

1. A computer-implemented method for classifying data comprising:
   receiving a first signal associated with a set of categories, the set of categories being user defined;
   receiving at a server a second signal associated with a first set of one or more data items to be analyzed;
   presenting a selectable first category tab along a first side of a perimeter of a touch-sensitive graphical user interface;
   presenting a selectable second category tab along a second side of the perimeter of the touch-sensitive graphical user interface, wherein the second category tab corresponds to a continuous region of the second side of the perimeter of the touch-sensitive graphical user interface;
   presenting a selectable third category tab along a third side of the perimeter of the touch-sensitive graphical user interface, wherein the third category tab corresponds to a continuous region of the third side of the perimeter of the touch-sensitive graphical user interface;
   presenting a selectable fourth category tab along a fourth side of the perimeter of the touch-sensitive graphical user interface, wherein the fourth category tab corresponds to a continuous region of the fourth side of the perimeter of the touch-sensitive graphical user interface, the first, second, third, and fourth category tabs define a display area on the of the touch-sensitive graphical user interface;
   presenting each of the one or more data items of the first set to be analyzed as a tile on a tile overlay on the touch-sensitive graphical user interface, wherein each of the one or more data items comprise at least one document and wherein the tile associated with each of the one or more data items comprises a visual representation of a segment of the document, and wherein the one or more data items are presented in the display area in a grid with the first second third and fourth category tabs surrounding the one or more data items;
   receiving a first swipe identification signal, said first swipe identification signal being directionally oriented toward the first category tab to identify a first category from the set of categories to apply to a first data item from the first set of one or more data items to be analyzed, wherein the first category is a first level of conformity with respect to a topic or query;
   receiving a second swipe identification signal, said second swipe identification signal being directionally oriented toward the second category tab to identify a second category from the set of categories to apply to a second data item from the first set of one or more data items to be analyzed, wherein the second category is a second level of conformity with respect to the topic or query;

receiving a third swipe identification signal, said third swipe identification signal being directionally oriented toward the third category tab to identify a third category from the set of categories to apply to a third data item from the first set of one or more data items to be analyzed, wherein the third category is a third level of conformity with respect to the topic or query;

receiving a fourth swipe identification signal, said fourth swipe identification signal being directionally oriented toward the fourth category tab to identify a fourth category from the set of categories to apply to a fourth data item from the first set of one or more data items to be analyzed, wherein the fourth category is a fourth level of conformity with respect to the topic or query;

wherein the first level of conformity is a higher degree of conformity as compared to the second level of conformity, the second level of conformity is a higher degree of conformity as compared to the third level of conformity and the fourth level of conformity is an uncertainty of conformity decision with respect to the topic or query;

wherein the first swipe identification signal comprises initiating a first finger swipe gesture on the first data item and dragging the first data item to the first category tab representative of the first category located along the perimeter of the touch-sensitive graphical user interface, and wherein in response to the first swipe identification signal affixing a first category label to the tile associated with the first data item in the touch-sensitive graphical user interface;

wherein the second swipe identification signal comprises initiating a second finger swipe gesture on the second data item and dragging the second data item to the second category tab representative of the second category located along the perimeter of the touch-sensitive graphical user interface, and wherein in response to the second swipe identification signal affixing a second category label to the tile associated with the second data item in the touch-sensitive graphical user interface;

wherein the third swipe identification signal comprises initiating a third finger swipe gesture on the third data item and dragging the third data item to the third category tab representative of the third category located along the perimeter of the touch-sensitive graphical user interface, and wherein in response to the third swipe identification signal affixing a third category label to the tile associated with the third data item in the touch-sensitive graphical user interface;

wherein the fourth swipe identification signal comprises initiating a fourth finger swipe gesture on the fourth data item and dragging the fourth data item to the fourth category tab representative of the fourth category located along the perimeter of the touch-sensitive graphical user interface, and wherein in response to the fourth swipe identification signal affixing a fourth category label to the tile associated with the fourth data item in the touch-sensitive graphical user interface;

in response to a selection of at least one of the first, second, third, and fourth category tabs, identifying from the first set of data items, data items associated with the selected at least one of the first, second, third, and fourth category tabs and updating the touch-sensitive graphical user interface to display in the display area only the data items associated with the selected at least one of the first, second, third, and fourth category tabs:

based upon the first, second, third, and fourth swipe identification signals, generating a first record, a second record, a third record and a fourth record, the first record associating the first data item with the first category, the second record associating the second data item with the second category, the third record associating the third data item with the third category and the fourth record associating the fourth data item with the fourth category;

storing the first, second, third, and fourth records in a memory; and generating a summary report comprising a set of statistical data values to each of the first, second, third, and fourth records, a given set of statistical data values corresponding to one more categories assigned to a given data item, said given set of statistical values comprising a classification average score, a classification variance score, a classification standard deviation score and a classification normalized average score.

2. The computer-implemented method of claim 1 further comprising generating a spreadsheet file comprising the first, second and third records.

3. The computer-implemented method of claim 1 further comprising displaying an administration interface tool comprising a UI administration interface, a deck administration interface and a user administration interface.

4. The computer-implemented method of claim 3 further comprising populating a category name field, a category label field and a screen location field in the UI administration interface for each category of the set of categories to be assigned a data item, the screen location field populated with a screen location value representative of the location on the graphical user interface of a visual representation of each category.

5. The computer-implemented method of claim 4 further comprising:
populating an end user name field and an end user email address field for one or more end users in the user administration interface; and
assigning an end user identification, an end user password and an end user role to each of the one or more end users in the user administration interface.

6. The computer-implemented method of claim 4 further comprising:
generating, using the deck administration interface, one or more sets of one or more data items to be analyzed; and
assigning, using the deck administration interface, one or more end users to the one or more sets of one or more data items to be analyzed.

7. The method of claim 1, wherein the first category tab corresponds to another continuous region encompassing an entirety of a total length of the first side of the perimeter of the touch-sensitive graphical user interface, and the first side of the perimeter of the touch-sensitive graphical user interface is adjacent to the second side of the perimeter of the touch-sensitive graphical user interface, and wherein the second side of the perimeter of the touch-sensitive graphical user interface is adjacent to the third side of the perimeter of the touch-sensitive graphical user interface, therewith presenting the first, second, and third category tabs in order according to degree of conformity with respect to the topic or query.

8. The method of claim 1, wherein a total number of category tabs is greater than another total number of sides of the perimeter of the touch-sensitive graphical user interface, and an entirety of at least one side of the perimeter of the touch-sensitive graphical user interface is evenly divided into two or more continuous regions each corresponding to a category tab.

9. Non-transitory computer readable media comprising program code stored thereon for execution by a programmable processor to perform a method for classifying data, the non-transitory computer readable media comprising:

program code for receiving a first signal associated with a set of categories, the set of categories being user defined;

program code for receiving a second signal associated with a first set of one or more data items to be analyzed;

program code for presenting a selectable first category tab along a first side of a perimeter of a graphical user interface;

program code for presenting a selectable second category tab along a second side of the perimeter of the graphical user interface, wherein the second category tab corresponds to a continuous region of the second side of the perimeter of the graphical user interface;

program code for presenting a selectable third category tab along a third side of the perimeter of the touch-sensitive graphical user interface, wherein the third category tab corresponds to a continuous region of the third side of the perimeter of the touch-sensitive graphical user interface;

program code for presenting a selectable fourth category tab along a fourth side of the perimeter of the touch-sensitive graphical user interface, wherein the fourth category tab corresponds to a continuous region of the fourth side of the perimeter of the touch-sensitive graphical user interface. the first, second, third, and fourth category tabs define a display area on the of the touch-sensitive graphical user interface;

program code for presenting each of the one or more data items of the first set to be analyzed on a tile overlay on the graphical user interface. wherein each of the one or more data items comprise at least one document and wherein the tile associated with each of the one or more data items comprises a visual representation of a segment of the document, and wherein the one or more data items are presented in the display area in a grid with the first, second, third, and fourth category tabs surrounding the one or more data items;

program code for receiving a first swipe identification signal, said first swipe identification signal being directionally oriented toward the first category tab to identify a first category from the set of categories to apply to a first data item from the first set of one or more data items to be analyzed, wherein the first category is a first level of conformity with respect to the topic or query;

program code for receiving a second swipe identification signal, said second swipe identification signal being directionally oriented toward the second category tab to identify a second category from the set of categories to apply to a second data item from the first set of one or more data items to be analyzed, wherein the second category is a second level of conformity with respect to the topic or query;

program code for receiving a third swipe identification signal, said third swipe identification signal being directionally oriented toward the third category tab to identify a third category from the set of categories to apply to a third data item from the first set of one or more data items to be analyzed, wherein the third category is a third level of conformity with respect to the topic or query;

program code for receiving a fourth swipe identification signal, said fourth swipe identification signal being directionally oriented toward the fourth category tab to identify a fourth category from the set of categories to apply to a fourth data item from the first set of one or more data items to be analyzed, wherein the fourth category is a fourth level of conformity with respect to the topic or query;

wherein the first level of conformity is a higher degree of conformity as compared to the second level of conformity, the second level of conformity is a higher degree of conformity as compared to the third level of conformity and the fourth level of conformity is an uncertainty of conformity decision with respect to the topic or query;

wherein the first swipe identification signal comprises initiating a first finger swipe gesture on the first data item and dragging the first data item to the first category tab representative of the first category located along the perimeter of the graphical user interface, and wherein in response to the first swipe identification signal affixing a first category label to the tile associated with the first data item in the touch-sensitive graphical user interface;

wherein the second swipe identification signal comprises initiating a second finger swipe gesture on the second data item and dragging the second data item to the second category tab representative of the second category located along the perimeter of the graphical user interface, and wherein in response to the second swipe identification signal affixing a second category label to the tile associated with the second data item in the touch-sensitive graphical user interface;

wherein the third swipe identification signal comprises initiating a third finger swipe gesture on the third data item and dragging the third data item to the third category tab representative of the third category located along the perimeter of the touch-sensitive graphical user interface, and wherein in response to the third swipe identification signal affixing a third category label to the tile associated with the third data item in the touch-sensitive graphical user interface;

wherein the fourth swipe identification signal comprises initiating a fourth finger swipe gesture on the fourth data item and dragging the fourth data item to the fourth category tab representative of the fourth category located along the perimeter of the touch-sensitive graphical user interface, and wherein in response to the fourth swipe identification signal affixing a fourth category label to the tile associated with the fourth data item in the touch-sensitive graphical user interface;

program code for, in response to a selection of at least one of the first, second, third, and fourth category tabs, identifying from the first set of data items, data items associated with the selected at least one of the first, second, third, and fourth category tabs and updating the touch-sensitive graphical user interface to display in the display area only the data items associated with the selected at least one of the first, second, third, and fourth category tabs;

program code for, based upon the first, second, third, and fourth swipe identification signals, generating a first record, a second record, a third record and a fourth record, the first record associating the first data item with the first category, the second record associating the second data item with the second category, the third record associating the third data item with the third category and the fourth record associating the fourth data item with the fourth category;

program code for storing the first, second, third, and fourth records in a memory; and program code for generating a summary report comprising a set of statistical data values to each of the first, second, third, and fourth records, a given set of statistical data values corresponding to one more categories assigned to a given data item, said given set of statistical values comprising a classification average score, a classification variance score, a classification standard deviation score and a classification normalized average score.

10. The non-transitory computer readable media of claim 9 further comprising program code for generating a spreadsheet file comprising the first, second and third records.

11. The non-transitory computer readable media of claim 9 further comprising program code for displaying an administration interface tool comprising a UI administration interface, a deck administration interface and a user administration interface.

12. The non-transitory computer readable media of claim 11 further comprising program code for populating a category name field, a category label field and a screen location field in the UI administration interface for each category of the set of categories to be assigned a data item, the screen location field populated with a screen location value representative of the location on the graphical user interface of a visual representation of each category.

13. The non-transitory computer readable media of claim 12 further comprising:

program code for populating an end user name field and an end user email address field for one or more end users in the user administration interface; and program code for assigning an end user identification, an end user password and an end user role to each of the one or more end users in the user administration interface.

14. The non-transitory computer readable media of claim 12 further comprising:

program code for generating, using the deck administration interface, one or more sets of one or more data items to be analyzed; and program code for assigning, using the deck administration interface, one or more end users to the one or more sets of one or more data items to be analyzed.

15. A system for classifying data, the system comprising:

a data repository comprising a first memory; and a server including a processor configured to:

receive a first signal associated with a set of categories, the set of categories being user defined;

receive a second signal associated with a first set of one or more data items to be analyzed;

present a selectable first category tab along a first side of a perimeter of a touch-sensitive graphical user interface;

present a selectable second category tab along a second side of the perimeter of the touch-sensitive graphical user interface, wherein the second category tab corresponds to a continuous region of the second side of the perimeter of the touch-sensitive graphical user interface;

present a selectable third category tab along a third side of the perimeter of the touch-sensitive graphical user interface, wherein the third category tab corresponds to a continuous region of the third side of the perimeter of the touch-sensitive graphical user interface;

present a selectable fourth category tab along a fourth side of the perimeter of the touch-sensitive graphical user interface, wherein the fourth category tab corresponds to a continuous region of the fourth side of the perimeter of the touch-sensitive graphical user interface, the first, second, third, and fourth category tabs define a display area on the of the touch-sensitive graphical user interface;

present each of the one or more data items of the first set to be analyzed on a tile overlay on the touch-sensitive graphical user interface, wherein each of the one or more data items comprise at least one document and wherein the tile associated with each of the one or more data items comprises a visual representation of a segment of the document, and wherein the one or more data items are presented in the display area in a grid with the first, second, third, and fourth category tabs surrounding the one or more data items;

receive a first swipe identification signal, said first swipe identification signal being directionally oriented toward the first category tab to identify a first category from the set of categories to apply to a first data item from the first set of one or more data items to be analyzed, wherein the first category is a first level of conformity with respect to a topic or query;

receive a second swipe identification signal, said second swipe identification signal being directionally oriented toward the second category tab to identify a second category from the set of categories to apply to a second data item from the first set of one or more data items to be analyzed, wherein the second category is a second level of conformity with respect to the topic or query;

receive a third swipe identification signal, said third swipe identification signal being directionally oriented toward the third category tab to identify a third category from the set of categories to apply to a third data item from the first set of one or more data items to be analyzed, wherein the third category is a third level of conformity with respect to the topic or query;

receive a fourth swipe identification signal, said fourth swipe identification signal being directionally oriented toward the fourth category tab to identify a fourth category from the set of categories to apply to a fourth data item from the first set of one or more data items to be analyzed, wherein the fourth category is a fourth level of conformity with respect to the topic or query;

wherein the first level of conformity is a higher degree of conformity as compared to the second level of conformity, the second level of conformity is a higher degree of conformity as compared to the third level of conformity and the fourth level of conformity is an uncertainty of conformity decision with respect to the topic or query;

wherein the first swipe identification signal comprises initiating a first finger swipe gesture on the first data item and dragging the first data item to the first category tab representative of the first category located along the perimeter of the touch-sensitive graphical user interface, and wherein in response to the first swipe identification signal affixing a first category label to the tile associated with the first data item in the touch-sensitive graphical user interface;

wherein the second swipe identification signal comprises initiating a second finger swipe gesture on the second data item and dragging the second data item to the second category tab representative of the second category located along the perimeter of the touch-sensitive graphical user interface, and wherein in response to the second swipe identification signal affixing a second category label to the tile associated with the second data item in the touch-sensitive graphical user interface;

wherein the third swipe identification signal comprises initiating a third finger swipe gesture on the third data item and dragging the third data item to the third category tab representative of the third category located along the perimeter of the touch-sensitive graphical user interface, and wherein in response to the third swipe identification signal affixing a third category label to the tile associated with the third data item in the touch-sensitive graphical user interface;

wherein the fourth swipe identification signal comprises initiating a fourth finger swipe gesture on the fourth data item and dragging the fourth data item to the fourth category tab representative of the fourth category located along the perimeter of the touch-sensitive graphical user interface, and wherein in response to the fourth swipe identification signal affixing a fourth category label to the tile associated with the fourth data item in the touch-sensitive graphical user interface;

in response to a selection of at least one of the first, second, third, and fourth category tabs, identifying from the first set of data items, data items associated with the selected at least one of the first, second, third, and fourth category tabs and updating the touch-sensitive graphical user interface to display in the display area only the data items associated with the selected at least one of the first, second, third, and fourth category tabs based upon the first, second, third, and fourth swipe identification signals, generate a first record, a second record, a third record and a fourth record, the first record associating the first data item with the first category, the second record associating the second data item with the second category, the third record associating the third data item with the third category and the fourth record associating the fourth data item with the fourth category;

store the first, second, third, and fourth records in a memory; and generate a summary report comprising a set of statistical data values to each of the first, second, third, and fourth records, a given set of statistical data values corresponding to one more categories assigned to a given data item, said given set of statistical values comprising a classification average score, a classification variance score, a classification standard deviation score and a classification normalized average score.

16. The system of claim 15 wherein the server is further configured to generate a spreadsheet file comprising the first, second and third records.

17. The system of claim 15 wherein the server is further configured to display an administration interface tool comprising a UI administration interface, a deck administration interface and a user administration interface.

18. The system of claim 15 wherein the server is further configured to populate a category name field, a category label field and a screen location field in a UI administration interface for each category of the set of categories to be assigned a data item, the screen location field populated with a screen location value representative of a location on the graphical user interface of a visual representation of each category.

19. The system of claim 18 wherein the server is further configured to:
populate an end user name field and an end user email address field for one or more end users in a user administration interface; and
assign an end user identification, an end user password and an end user role to each of the one or more end users in the user administration interface.

20. The system of claim 18 wherein the server is further configured to:
generate, using a deck administration interface, one or more sets of one or more data items to be analyzed; and
assign, using the deck administration interface, one or more end users to the one or more sets of one or more data items to be analyzed.

* * * * *